US011878842B2

(12) United States Patent
Roe et al.

(10) Patent No.: US 11,878,842 B2
(45) Date of Patent: Jan. 23, 2024

(54) BOTTLE ASSEMBLY AND VALVE ASSEMBLY

(71) Applicant: Mayborn (UK) Limited, New Castle Upon Tyne (GB)

(72) Inventors: James Roe, Cramlington (GB); Jason Roebuck, Cramlington (GB); Matthew O'Brien, Cramlington (GB); Richard Parker, Cramlington (GB); Peter Angus, Cramlington (GB)

(73) Assignee: Mayborn (UK) Limited, New Castle Upon Tyne (GB)

( * ) Notice: Subject to any disclaimer, the term of this patent is extended or adjusted under 35 U.S.C. 154(b) by 0 days.

(21) Appl. No.: 17/503,812

(22) Filed: Oct. 18, 2021

(65) Prior Publication Data

US 2022/0105010 A1 Apr. 7, 2022

Related U.S. Application Data

(63) Continuation of application No. 16/095,438, filed as application No. PCT/GB2017/051117 on Apr. 21, 2017, now Pat. No. 11,147,743.

(30) Foreign Application Priority Data

Apr. 21, 2016 (GB) ..................................... 1606987

(51) Int. Cl.
*B65D 41/17* (2006.01)
*A61J 9/00* (2006.01)
(Continued)

(52) U.S. Cl.
CPC ................ *B65D 41/17* (2013.01); *A61J 9/00* (2013.01); *A61J 11/04* (2013.01); *A61J 9/04* (2013.01);
(Continued)

(58) Field of Classification Search
CPC ......... A61J 11/04; A61J 11/045; B65D 41/16; B65D 41/17
See application file for complete search history.

(56) References Cited

U.S. PATENT DOCUMENTS

| | | | |
|---|---|---|---|
| 1,999,581 | A | 4/1935 | Atkin et al. |
| 2,426,927 | A | 9/1947 | Ganson |

(Continued)

FOREIGN PATENT DOCUMENTS

| | | |
|---|---|---|
| CN | 101641073 | 2/2010 |
| CN | 103189033 | 7/2013 |

(Continued)

OTHER PUBLICATIONS

Combed Search and Examination Report under Sections 18 and 18(3); Sep. 28, 2016; 6 pages.

(Continued)

*Primary Examiner* — John K Fristoe, Jr.
*Assistant Examiner* — Jennifer Castriotta
(74) *Attorney, Agent, or Firm* — Fish & Richardson P.C.

(57) ABSTRACT

A bottle assembly is provided including a bottle having an end portion with a first detent formation, and a collar having a second complementary detent formation. The collar is arranged to snap fit to the end portion by engagement of the detent formations by application of force only in a direction towards the bottle. In addition, a valve assembly for use with a drinking vessel is provided including a base member and a sealing member. The sealing member is movable, dependent on a pressure difference across it, between a sealed position, wherein the sealing member is sealed against the base member, and an unsealed position, wherein the sealing member is unsealed from the base member. One or more channels are formed between the base member and the sealing member and are arranged to allow air to enter the (Continued)

drinking vessel when the sealing member is in the unsealed position.

15 Claims, 28 Drawing Sheets

(51) Int. Cl.

| | |
|---|---|
| ***A61J 11/04*** | (2006.01) |
| ***A61J 9/04*** | (2006.01) |
| *B65D 77/22* | (2006.01) |
| *B65D 1/06* | (2006.01) |
| *B65D 47/20* | (2006.01) |

(52) U.S. Cl.

CPC ............... *A61J 11/045* (2013.01); *B65D 1/06* (2013.01); *B65D 47/2018* (2013.01); *B65D 77/225* (2013.01)

(56) References Cited

U.S. PATENT DOCUMENTS

| | | | | |
|---|---|---|---|---|
| 3,567,060 | A * | 3/1971 | Ballin | A61J 11/0095 215/11.6 |
| 3,836,034 | A | 9/1974 | Lecinski, Jr. | |
| 4,613,050 | A | 9/1986 | Atkin et al. | |
| 5,544,778 | A * | 8/1996 | Goncalves | B65D 41/0471 206/820 |
| 5,704,500 | A | 1/1998 | Hoffman et al. | |
| 6,138,847 | A * | 10/2000 | Johnson | A61J 9/00 215/11.1 |
| 6,616,000 | B1 * | 9/2003 | Renz | A61J 9/001 215/11.1 |
| 7,731,050 | B2 * | 6/2010 | Parks | B65D 43/0212 220/780 |
| 8,875,913 | B2 * | 11/2014 | Diaz | A61J 9/001 222/326 |
| 9,913,779 | B2 * | 3/2018 | Rozenbaum | A61J 11/0065 |
| 10,159,628 | B2 * | 12/2018 | Edgerley | A61J 9/00 |
| 11,147,743 | B2 | 10/2021 | Roe et al. | |
| 2005/0056610 | A1 | 3/2005 | Randolph et al. | |
| 2007/0068890 | A1 | 3/2007 | Rohrig | |
| 2008/0173612 | A1 | 7/2008 | Renz | |
| 2011/0155684 | A1 | 6/2011 | Sirota | |
| 2014/0291272 | A1 * | 10/2014 | Weil | A61J 9/00 215/11.5 |
| 2015/0144584 | A1 | 3/2015 | Renz et al. | |
| 2015/0208838 | A1 | 7/2015 | Parker et al. | |
| 2019/0133889 | A1 | 5/2019 | Roe et al. | |

FOREIGN PATENT DOCUMENTS

| | | |
|---|---|---|
| DE | 102010024873 | 12/2011 |
| FR | 2187628 | 1/1974 |
| FR | 2887764 | 1/2007 |
| WO | WO2002018223 | 3/2002 |
| WO | WO2002094175 | 11/2002 |
| WO | WO2005000700 | 1/2005 |
| WO | WO2006000816 | 1/2006 |
| WO | WO2011157393 | 12/2011 |
| WO | WO2012037206 | 3/2012 |
| WO | WO2013081699 | 6/2013 |
| WO | WO2015142279 | 9/2015 |
| WO | WO2015173536 | 11/2015 |
| WO | WO2015176961 | 11/2015 |
| WO | WO2016038371 | 3/2016 |

OTHER PUBLICATIONS

EP Extended European Search Report in European Appln. No. EP20191829, dated Jan. 14, 2021, 7 pages.

International Preliminary Report on Patentability; dated Oct. 23, 2018; 9 pages.

Notification Concerning Transmittal of International Preliminary Report on Patentability Chapter I of the Patent Cooperation Treaty; dated Nov. 1, 2018, 1 page.

PCT International Search Report and Written Opinion in International Appln. No. PCT/GB2017/051117, dated Sep. 26, 2017, 9 pages.

Office Action in Australian Appln. No. 2017252600, dated Apr. 1, 2021, 5 pages.

Office Action in European Appln. No. 17719700.1, dated Aug. 12, 2020, 5 pages.

* cited by examiner

Fig. 6(*a*)

Fig. 14(a)
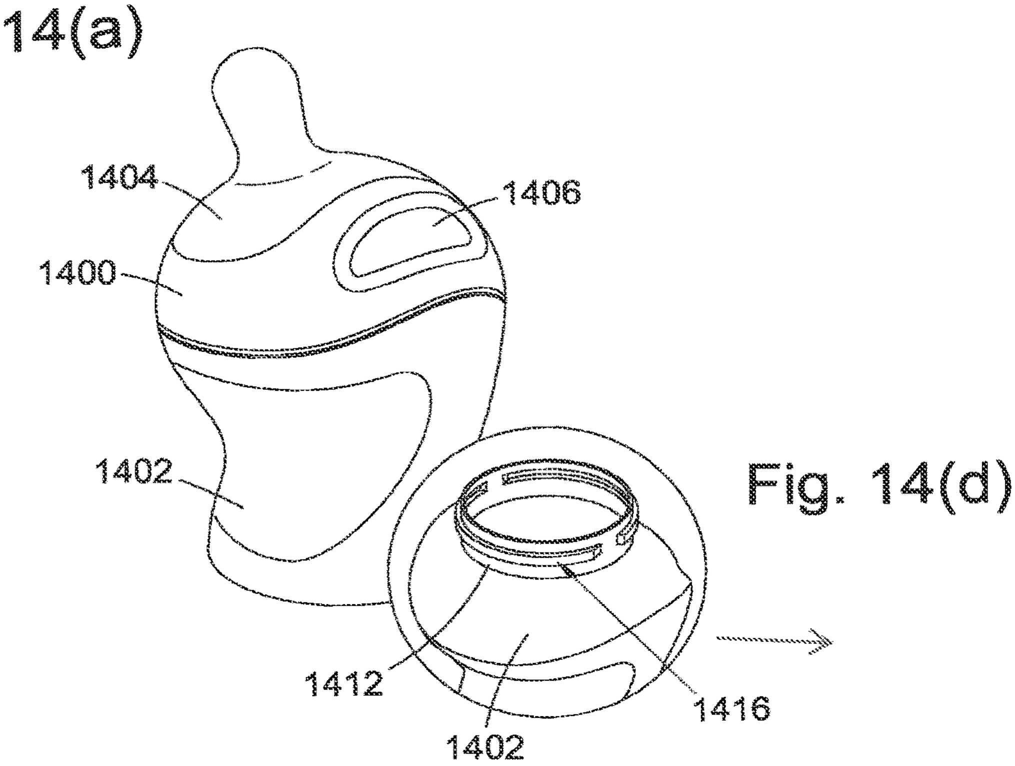
Fig. 14(d)
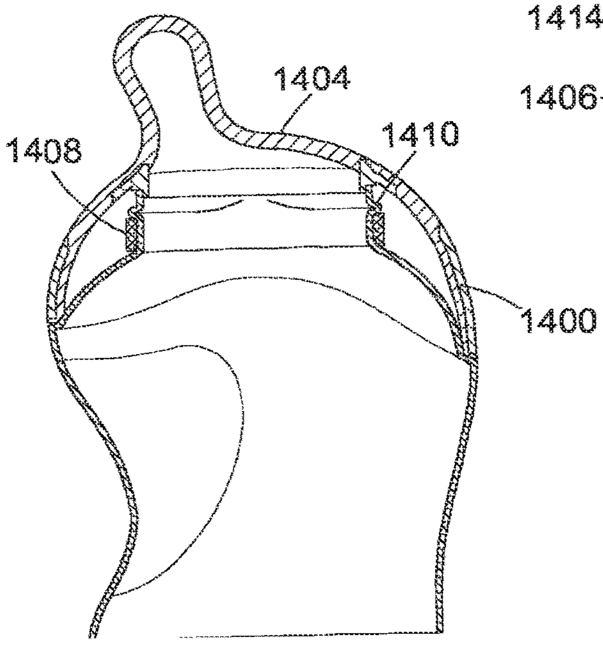
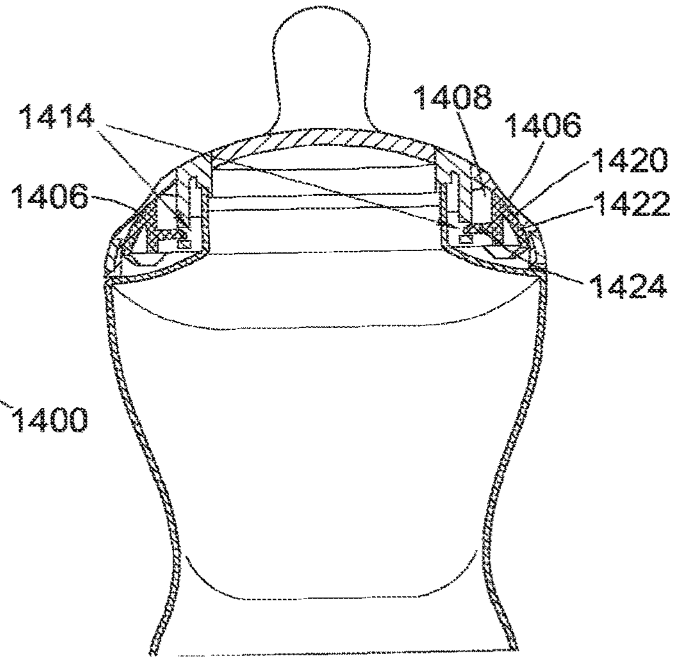
Fig. 14(c)
Fig. 14(b)

Fig. 20(a)
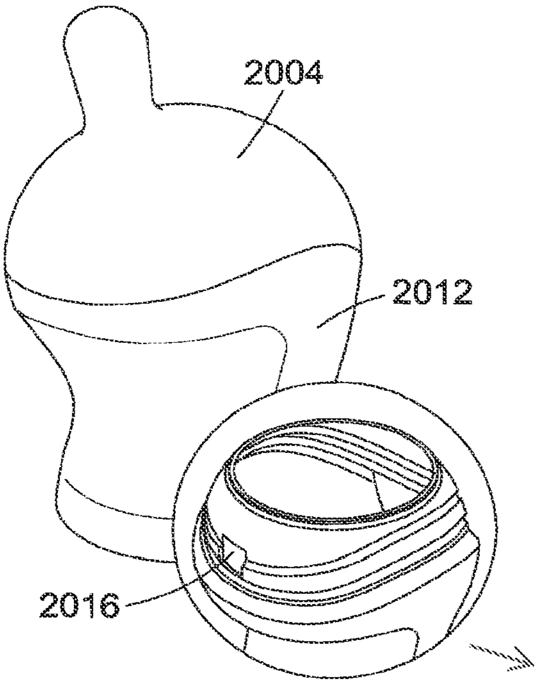
Fig. 20(d)
Fig. 20(c)
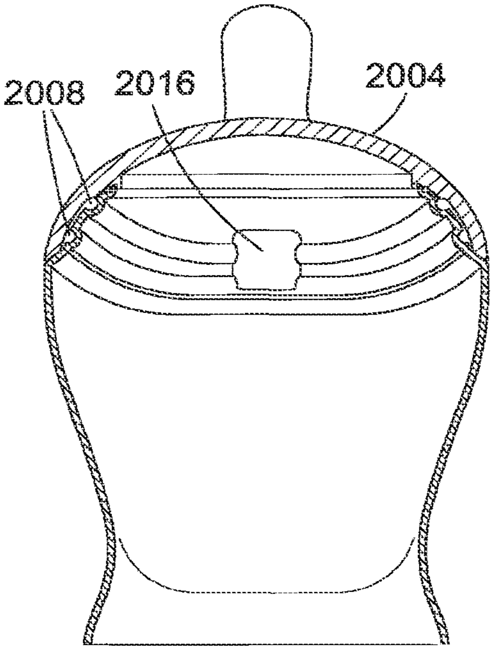
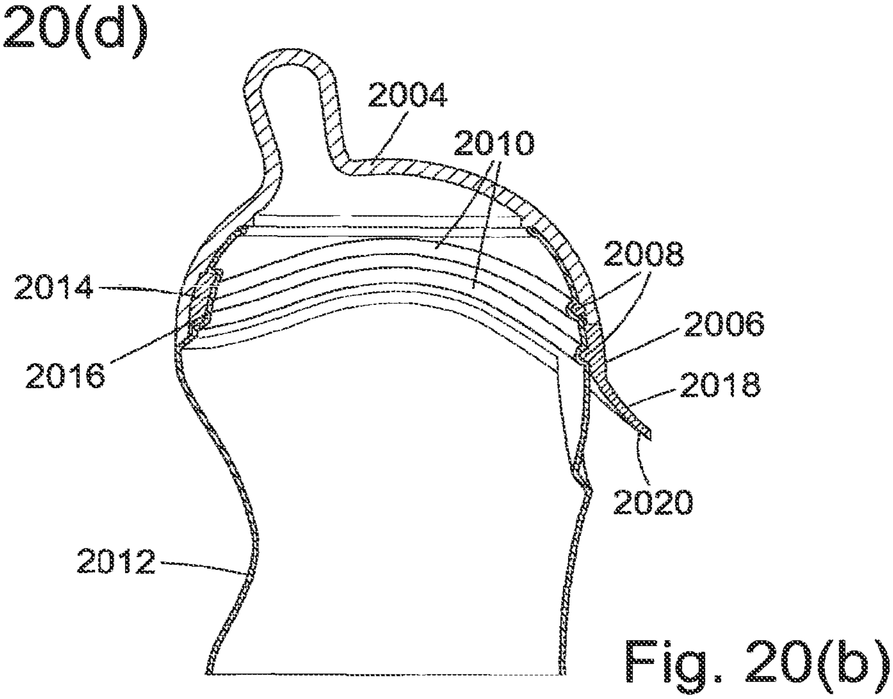
Fig. 20(b)

Fig. 21(a)
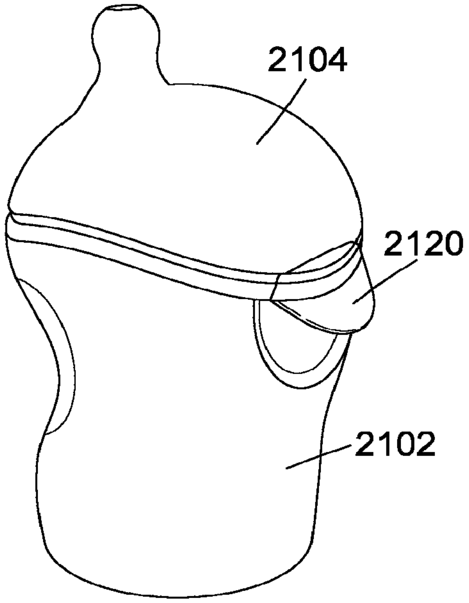
Fig. 21(c)
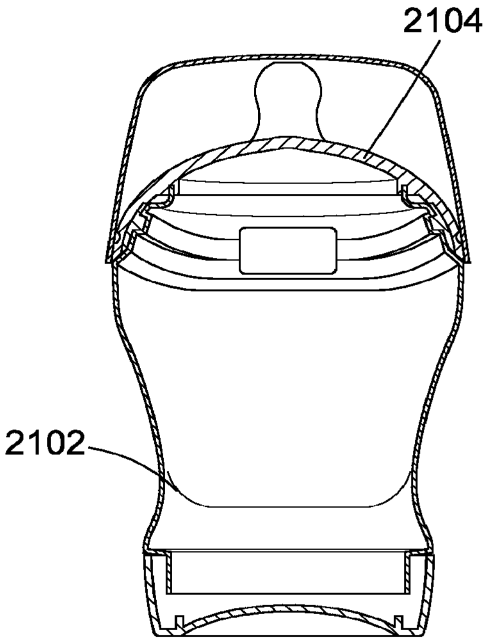
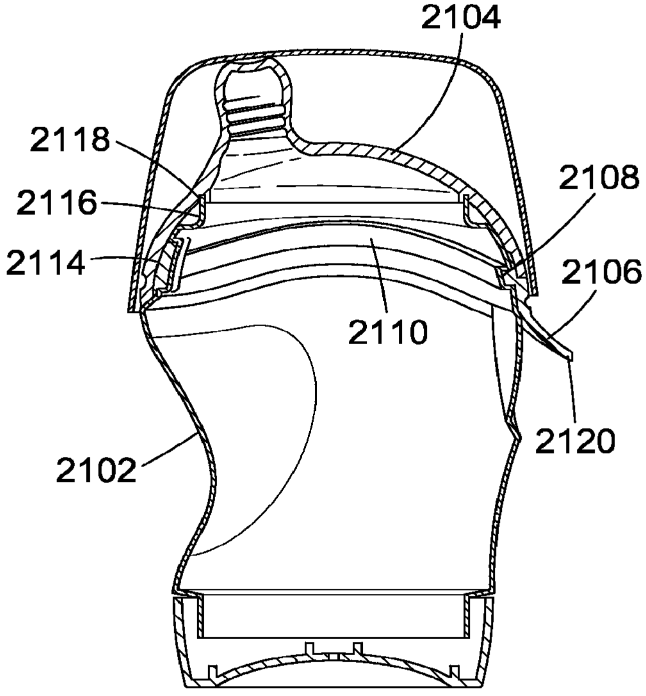
Fig. 21(b)
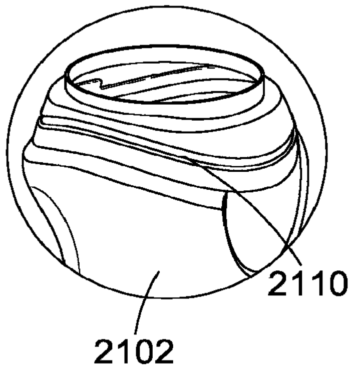
Fig. 21(d)

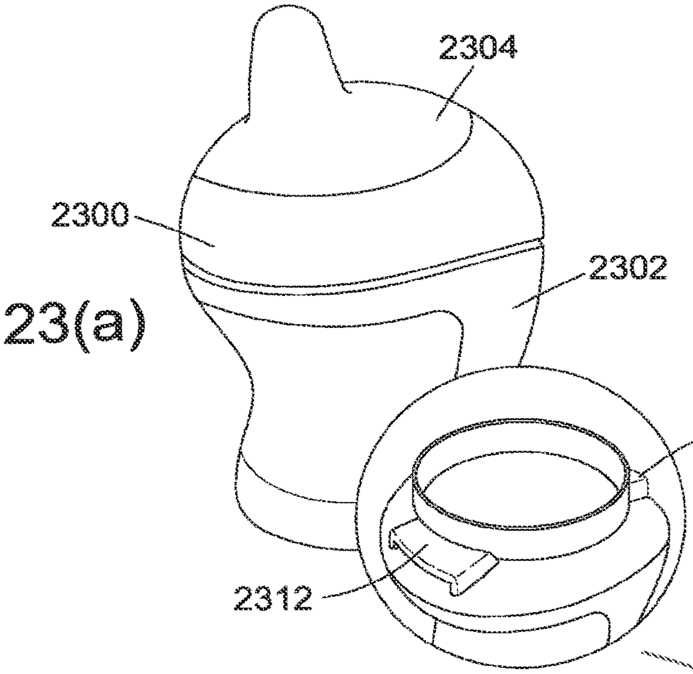
Fig. 23(a)
Fig. 23(d)
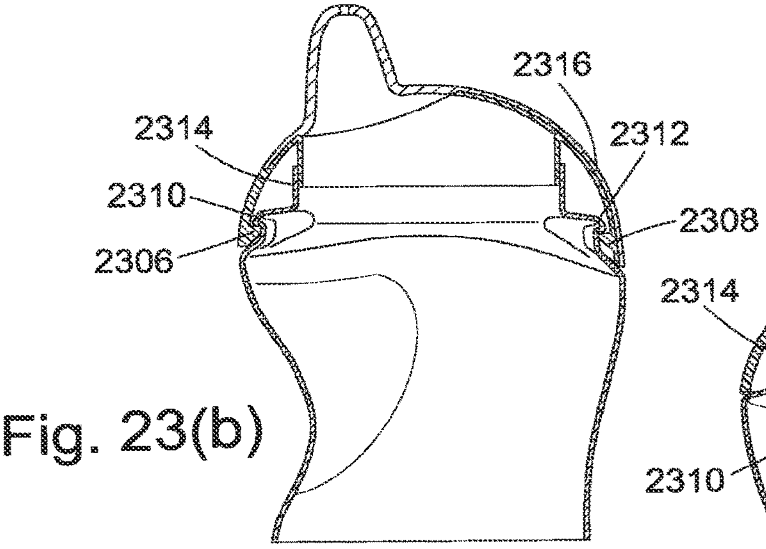
Fig. 23(b)
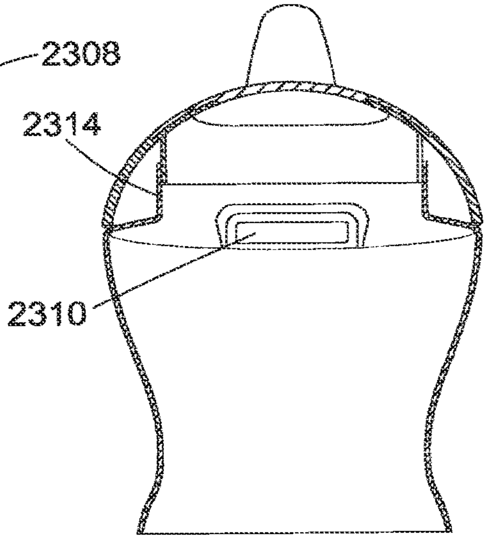
Fig. 23(c)

Fig. 24(a)
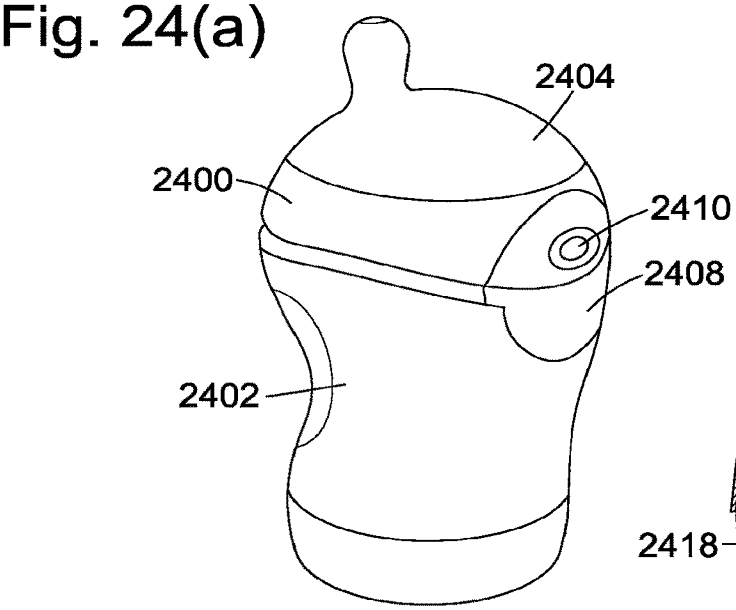
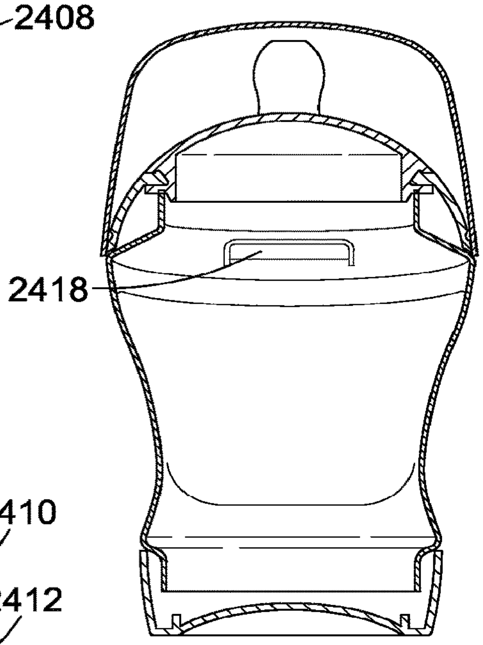
Fig. 24(c)
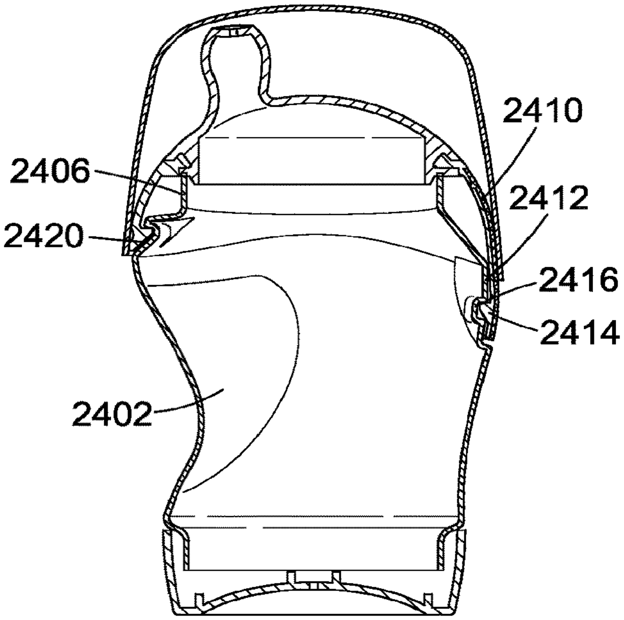
Fig. 24(b)
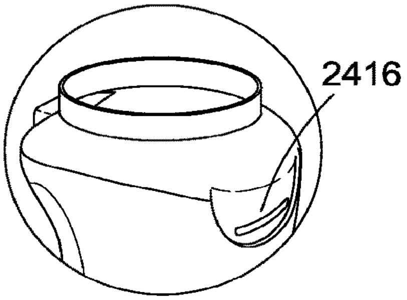
Fig. 24(d)

BOTTLE ASSEMBLY AND VALVE ASSEMBLY

CROSS REFERENCE TO RELATED APPLICATIONS

This application is a continuation of pending U.S. patent application Ser. No. 16/095,438, filed on Oct. 22, 2018, which was a 371 National Stage of International Application No. PCT/GB2017/051117, filed on Apr. 21, 2017, claiming priority from GB 1606987.4, filed on Apr. 21, 2016, all of which are herein incorporated by reference.

FIELD

The disclosure relates to a bottle assembly and valve assembly.

BACKGROUND

Feeding bottles, typically comprising a bottle, a teat (or nipple) and a collar for mounting them together are well known.

Research indicates that it is desirable to avoid the infant sucking air with milk from a feeding bottle, as this is thought to lead to colic, and that, as a result, it is preferable to keep the teat full of liquid. Various approaches have been disclosed to avoid the infant sucking air, including placing a valve in the bottom of the bottle to let air into the bottle as the infant sucks milk. In particular, such approaches usually let air in via holes in a bottom portion of the bottle. However, these holes can easily be blocked, and typically only allow a small amount of air to enter the bottle. Valves that reliably let air enter the bottle may be prone to leaks, while valves that avoid leaks may be less likely to reliably let air enter the bottle.

Various screw ring collars have been disclosed for mounting the teat to the bottle to provide a good seal in order to avoid leakage of milk from the bottle. However, screw ring collars may be difficult for a user to mount to a bottle, may be difficult to screw on tightly enough, or may be difficult to unscrew if screwed on too tightly, particularly if the user is also carrying an infant. Furthermore, when a screw ring collar is overtightened, the screw thread may wear out, thereby causing leaks, and the collar may no longer have a desired orientation with respect to the bottle when coupled to the bottle.

SUMMARY

An invention is set out in the claims.

By providing a valve assembly comprising a sealing member and a base member, wherein one or more channels are formed between the base member and the sealing member and extend to a periphery of the sealing member, air may enter the bottle in a more reliable manner.

By providing a bottle assembly comprising a bottle having a neck and a collar arranged to snap fit to the neck by application of force only in a downward direction, the collar may be easier to mount to the bottle, particularly when handled with only one hand.

BRIEF DESCRIPTION OF THE DRAWINGS

Examples of the present disclosure will now be explained with reference to the accompanying drawings in which:

FIG. 1(*b*) shows a perspective view of a bottle assembly comprising a teat assembly, collar, bottle, and base member;

FIG. 1(*c*) shows a perspective view of a bottle assembly comprising a collar, bottle, and base member;

FIG. 1(*d*) shows a perspective view of a bottle assembly comprising a bottle and a base member;

FIGS. 2(*b*), 2(*c*), and 2(*d*) show side views of a bottle neck;

FIG. 3(*c*) shows a perspective view of a collar from above;

FIG. 3(*d*) shows a perspective view of a collar from below;

FIG. 3(*e*) shows a bottom view of a collar;

FIG. 4(*b*) shows a bottom view of a teat assembly;

FIG. 4(*c*) shows a side view of a teat assembly;

FIG. 6(*b*) shows a flow chart of a method of disassembling a bottle assembly;

FIG. 7(*b*) shows a side view of a valve assembly in an assembled configuration;

FIG. 7(*c*) shows a perspective view of a valve assembly including a sealing member when a base member is removed;

FIG. 7(*d*) shows a side view of a valve assembly including a sealing member when a base member is removed;

FIG. 7(*e*) shows a perspective view of a bottle and a wall surrounding an aperture in the bottom of the bottle;

FIG. 7(*f*) shows a side view of a bottle and a wall surrounding an aperture in the bottom of the bottle;

FIG. 8(*b*) shows a top view of a sealing member;

FIG. 8(*c*) shows a side view of a sealing member;

FIG. 8(*d*) shows a perspective view of a sealing member from above;

FIG. 8(*e*) shows a perspective view of a sealing member from below;

FIG. 8(*f*) shows a perspective view of an alternative sealing member from above;

FIG. 9(*b*) shows a top view of a base member;

FIG. 9(*c*) shows a side view of a base member;

FIG. 9(*d*) shows a cross-sectional view of a base member;

FIG. 9(*e*) shows a perspective view of a base member from above;

FIGS. 14(*a*) to 14(*d*) show a second variant of a second embodiment of a bottle assembly;

FIGS. 20(*a*) to 20(*d*) show a third variant of a third embodiment of a bottle assembly;

FIGS. 21(*a*) to 21(*d*) show a fourth variant of a third embodiment of a bottle assembly;

FIGS. 23(*a*) to 23(*d*) show a second variant of a fourth embodiment of a bottle assembly;

FIGS. 24(*a*) to 24(*d*) show a third variant of a fourth embodiment of a bottle assembly.

Throughout the description and the drawings, like reference numerals refer to like parts.

DETAILED DESCRIPTION

Figure 1A:
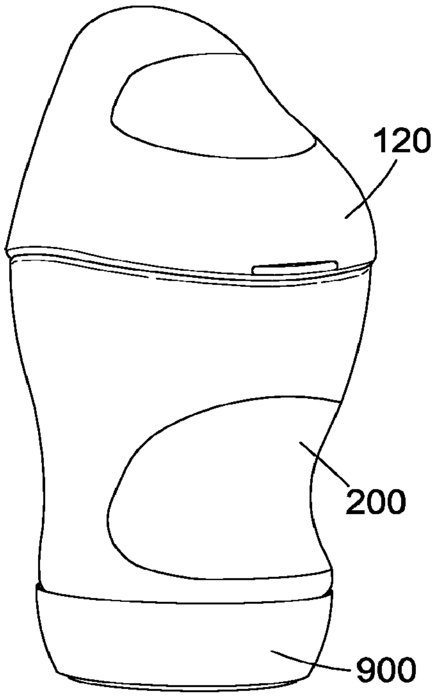
FIG. 1(*a*) shows a perspective view of a bottle assembly comprising a cap, bottle, and base member.
Figure 1B:
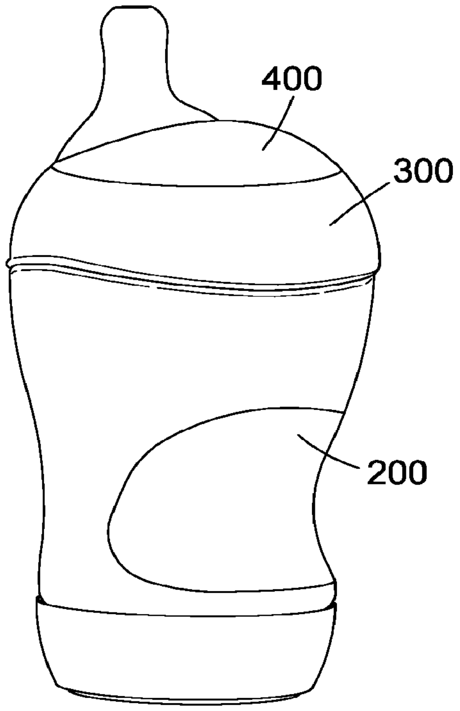
Figure 1C:
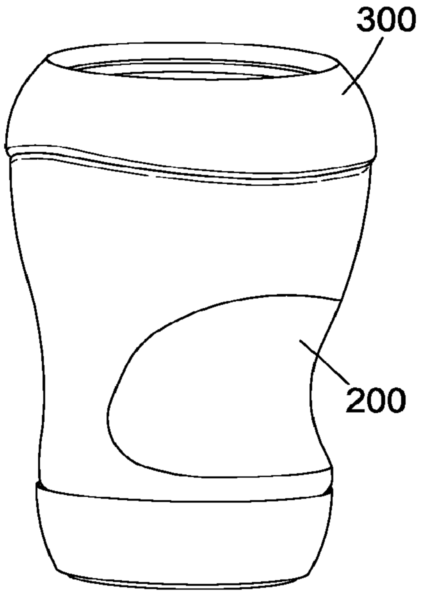
Figure 1D:
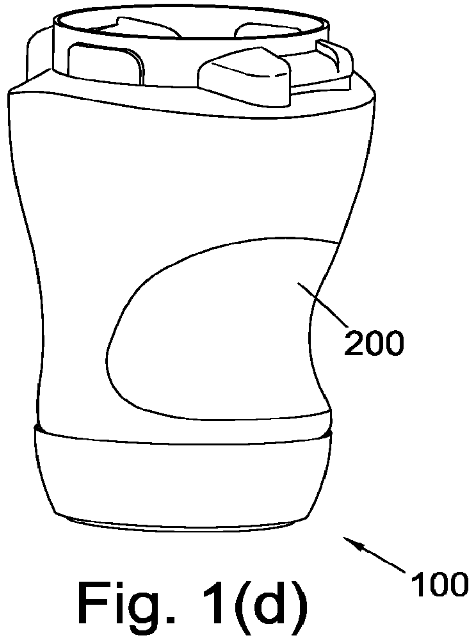
Figure 2A:
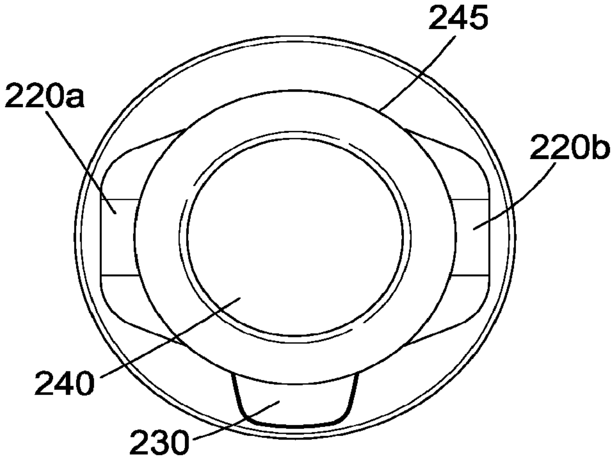
FIG. 2(*a*) shows a top view of a bottle neck.
Figure 2B:
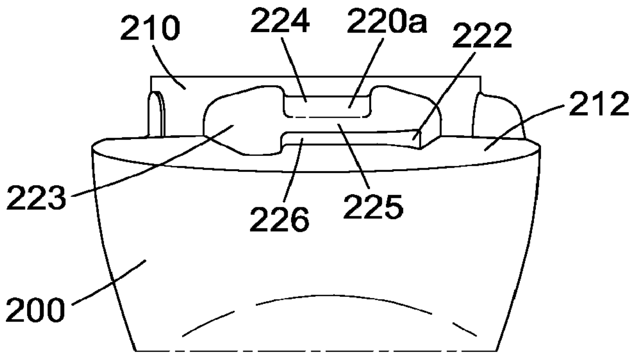
Figure 2C:
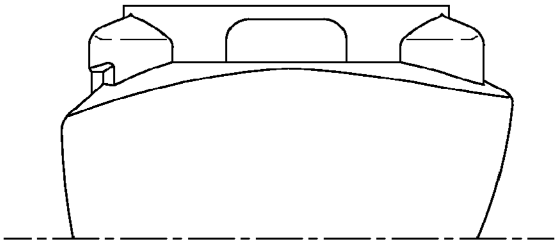
Figure 2D:
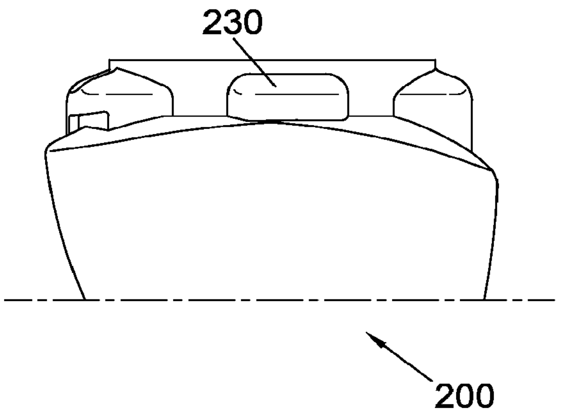
Figure 3A:
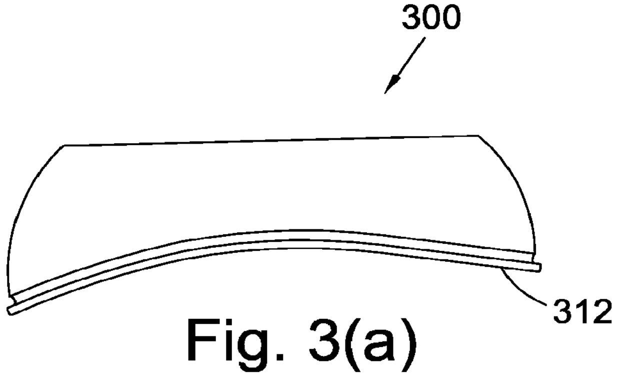
FIGS. 3(*a*) and 3(*b*) show side views of a collar.
Figure 3B:
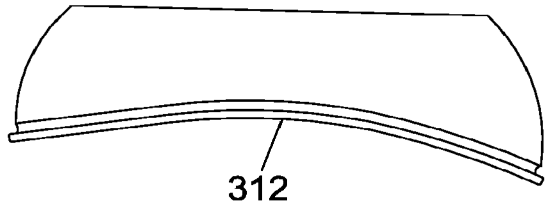
Figure 3C:
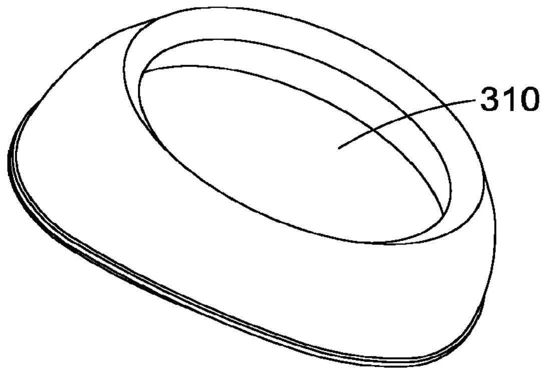
Figure 3D:
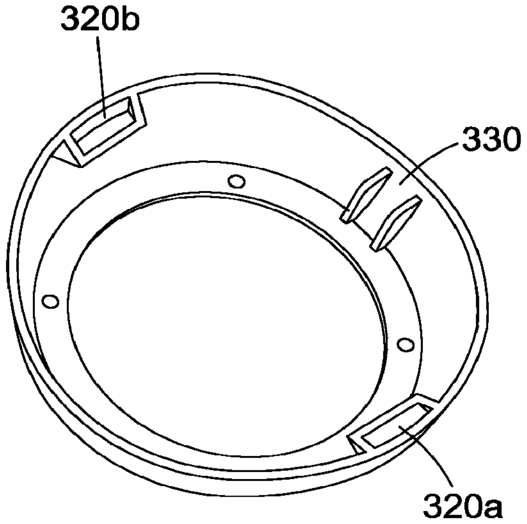
Figure 3E:
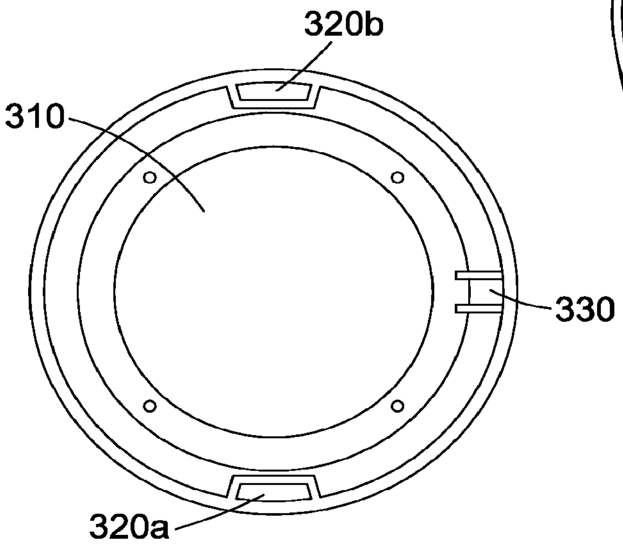

In overview, a bottle assembly and valve assembly are provided. The bottle assembly provides a 'push-fit' collar. The valve assembly allows air to enter a bottle as an infant sucks liquid from the bottle.

Bottle Assembly

FIGS. 1(*a*) to 1(*d*) show a bottle assembly 100. The bottle assembly 100 comprises a cap 120, a bottle (or drinking cup, drinking bottle, drinking vessel, feeding bottle, feeding cup, baby bottle, baby cup) 200, a base member 900, and a collar 300 into which a teat assembly (or nipple) 400 is inserted. The teat assembly 400 allows an infant to drink from the bottle 200. The collar 300 allows the teat assembly 400 to be mounted to the bottle 200, and prevents liquid from leaking from the bottle 200.

FIG. 1(*a*) shows the bottle assembly 100 with the cap 120 on, FIG. 1(*b*) shows the bottle assembly 100 with the cap 120 removed, FIG. 1(*c*) shows the bottle assembly 100 with the teat assembly 400 and cap 120 removed, and FIG. 1(*d*) shows the bottle assembly 100 with the collar 300, teat assembly 400, and cap 120 removed.

The bottle 200 has an end portion or neck 210, which surrounds an aperture 240 in the top of the bottle 200, a rim 245, and a shoulder 212, as shown in more detail in FIGS. 2(*a*) to 2(*d*). On its periphery, the neck 210 has two female detent formations 180—a first female detent formation 220*a* and a second female detent formation 220*b*—as well as an orienting protrusion 230. These components of the neck 210 will be described in more detail below.

The collar 300 is shown in more detail in FIGS. 3(*a*) to 3(*e*). The collar 300 comprises an aperture 310, and a first male detent formation 320*a* and a second male detent formation 320*b* on opposing sides of the aperture 310. The first and second male detent formations 320*a* and 320*b* respectively have shapes and positions complementary to the first and second female detent formations 220*a* and 220*b*, such that the collar 300 can snap fit to the neck 210 by engagement of the first male and first female detent formations 220*a* and 320*a* and engagement of the second male and second female detent formations 220*b* and 320*b* when force is applied only in a downward direction.

The first and second female detent formations 220*a* and 220*b* project outwards from the neck 210 and comprise an upper portion 224, a central portion 225, and a lower portion 226, which together form a cam surface. Upper portion 224 is angled, and the transition between the upper portion 224 and the central portion 225 is rounded, such that the first and second male detent formations 320*a* and 320*b* can smoothly snap fit to the neck 210. Central portion 225 is substantially vertical, thereby increasing the distance that the first and second male detent formations 320*a* and 320*b* must travel when the collar 300 is snap fitted to the neck 210 and hence enhancing the seal. Lower portion 226 is recessed relative to central portion 225, but nevertheless protrudes from the neck 210, such that the first and second male detent formations 320*a* and 320*b* can 'snap' into position, thereby securely fastening the collar 300 to the neck 210.

As force is applied to the collar 300 in a downward direction, the collar 300 is deformed and its radius locally expands in the vicinity of the first and second male detent formations 320*a* and 320*b* such that the first and second male detent formations 320*a* and 320*b* are able to slide over the corresponding protruding upper portions 224, down the corresponding protruding central portions 225, and into the corresponding lower portions 226. As the lower portions 226 are recessed relative to the upper portion 224 and the central portion 225, the collar 300 contracts and returns to its undeformed state when the first and second male detent formations 320*a* and 320*b* reach the corresponding lower portions 226.

The first and second female detent formations 220*a* and 220*b* have at least one open side 222 which permits the collar 300 to be uncoupled from the neck 210 when the collar 300 is rotated with respect to the neck 210.

In one example, the first and second female detent formations 220*a* and 220*b* are both open on a single, same side 222 (e.g., they are both open on the left side, or both open on the right side) and comprise a closed side 223 opposite the open side 222, such that the collar 300 can only be uncoupled from the neck 210 when the collar 300 is rotated in a particular (e.g., counter clockwise) direction with respect to the neck 210. When the collar 300 is rotated, the first and second male detent formations 320*a* and 320*b* then respectively slide out of the lower, recessed portions 226 of the first and second female detent formations 220*a* and 220*b* via the open sides 222.

The recessed portions 226 of the first and second female detent formations 220*a* and 220*b* are planar, or substantially planar, rather than being curved like the neck 210 and hence extend substantially tangentially to the neck circumference. As a result, the collar 300 cannot be accidentally uncoupled from the neck 210, and instead a force must be applied to the collar 300 to rotate it with respect to the neck 210 as the radius effectively increases requiring deformation of the collar as it is twisted.

In this example, the protruding portions of the first and second female detent formations 220*a* and 220*b* each resemble an L shape that has been rotated clockwise by 90°, with the short branch of the L shape being the closed side 223, and the long branch of the L shape comprising the upper portion 224 and central portion 225. The first and second female detent formations 220*a* and 220*b* and the first and second male detent formations 320*a* and 320*b* then form a bayonet-type connector for decoupling purposes, but a snap-fit connector for coupling purposes.

The protruding upper portions 224 of the first and second female detent formations 220*a* and 220*b* are large, guided lead-ins, thereby allowing the first and second male detent formations 320*a* and 320*b* to engage easily with the first and second female detent formations 220*a* and 220*b*.

The arrangement of the female and male detent formations 220*a*, 220*b*, 320*a*, and 320*b* thus allows the collar 300 to be coupled to the neck 210 by snap fitting by application of a force only in a downwards direction, and to be uncoupled from the neck 210 by twisting/rotating the collar 300 relative to the neck 210.

In order to keep the teat assembly 400 full of liquid when the bottle 200 is inverted, the bottle 200 and teat assembly 400 have a radially asymmetric shape, and the collar 300 is configured to be placed in a particular orientation with respect to the bottle 200 in order to ensure that the bottle 200 is held in a particular orientation during feeding. The collar 300, neck 210 and teat assembly 400 comprise a number of features designed to achieve this, as set out in the below examples. Any number of the features of these examples may be used either alone or in combination.

In particular, in one example, the neck 210 comprises a lower orienting protrusion 230 and the collar 300 comprises an upper orienting protrusion 330. The lower orienting protrusion 230 is placed on one side of the neck 210, and the upper orienting protrusion 330 is not placed on a corresponding side of the collar 300, but is instead placed on an opposite side of the collar 300. The neck 210 and collar 300 are thereby prevented from snap fitting in a predetermined, undesired relative orientation where the lower orienting protrusion 230 and the upper orienting protrusion 330 would be aligned.

In another example, the shoulder 212 and a rim 312 of the lower surface of the collar 300 also have complementary, radially asymmetric shapes, such that the neck 210 and collar 300 are prevented from snap fitting in a predetermined, undesired relative orientation. In this way, the user can easily determine, at a glance, which way around the collar 300 should be fitted relative to the neck 210.

In yet another example, the first and second female detent formations 220*a* and 220*b* and/or the first and second male detent formations 320*a* and 320*b* also have different shapes, such that the neck 210 and collar 300 are prevented from snap fitting in a predetermined, undesired relative orientation. In particular, one of the first and second detent female formations 220*a* and 220*b* has a larger height. In the example of FIGS. 2(*a*) to 2(*d*), the second female detent formation 220*b* has a larger height than the first female detent formation 220*a*.

When the shoulder 212 and rim 312 have different, complementary shapes, the first and second female detent formations 220*a* and 220*b* also have different shapes in order to ensure that the first female and male detent formations 220*a* and 320*a* and the second female and male detent formations 220*b* and 320*b* can nevertheless engage.

In order to flex over the first and second female detent formations 220*a* and 220*b*, the collar 300 may be fabricated from a material having a degree of flexibility. In order to withstand drop tests and to minimise distortion, the collar 300 may be fabricated from a material also having a degree of strength and rigidity. A suitable material for the fabrication of the collar 300 may be polypropylene, such as homopolymer polypropylene or copolymer polypropylene. Surprisingly, it was found that copolymer polypropylene provided a good tradeoff between flexibility and rigidity.

Figure 4A:
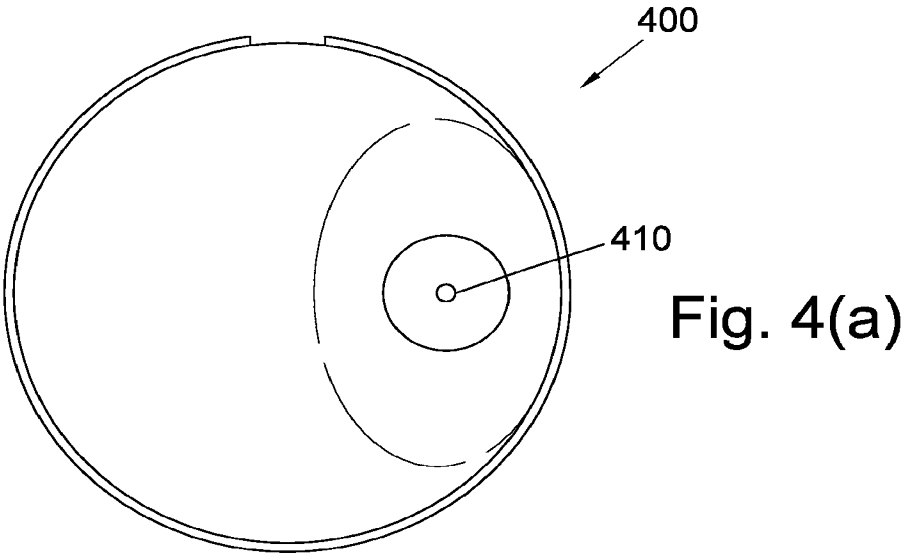
FIG. 4(*a*) shows a top view of a teat assembly.
Figure 4B:
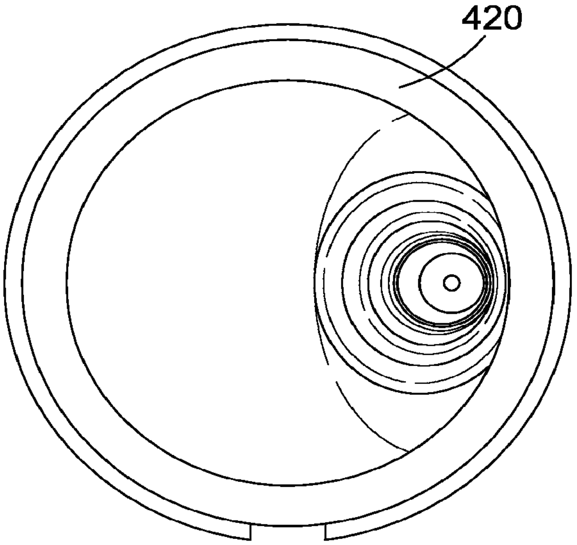
Figure 4C:
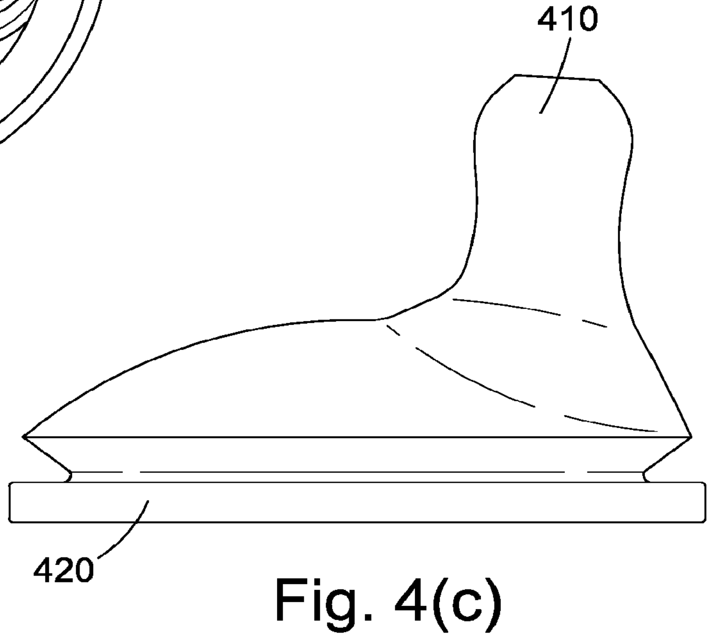

The teat assembly 400, shown in more detail in FIGS. 4(*a*) to 4(*c*), comprises a teat 410 through which liquid can be sucked. The teat assembly 400 is coupled to the collar 300. In one example, the teat assembly 400 is shaped so as to be insertable into the collar 300. In this way, the teat assembly 400 can easily be manufactured from a different material to that of the collar 300, and the teat assembly 400 can easily be cleaned. In another example, the teat assembly 400 is moulded to the collar 300, e.g., using co-moulding.

The teat assembly 400 has an annular flange (or annular rib) 420 at its lower periphery which seals against the collar 300 when the teat assembly 400 is coupled to the collar 300, and which also seals against the rim 245 of the neck 210 of the bottle 200 when the collar 300 is snap fitted to the bottle 200. The annular flange 420 enables the collar 300 to seal all the way around the aperture 240 in the top of the bottle, despite the fact that the collar 300 is only attached to the neck 210 at two points. The annular flange 420 also prevents the teat assembly 400 from being pulled through the collar 300.

The annular flange 420 may be fabricated from a soft, compressible material, thereby allowing for variation in alignment and height, while still providing a consistent seal. For example, the annular flange 420, or indeed the teat assembly 400, may be fabricated using silicone rubber. The annular flange 420 is designed to achieve a minimum amount of compression, in order to allow for consistent sealing. A degree of flexibility is also provided by the collar 300.

The dimensions of the collar 300, neck 210, female and male detent formations 220*a*, 220*b*, 320*a* and 320*b*, and annular flange 420 may be chosen in order to achieve a good seal of the annular flange 420 against the rim 245 of the neck 210 of the bottle 200, thereby avoiding leakage of liquid from the bottle 200.

Figure 5:
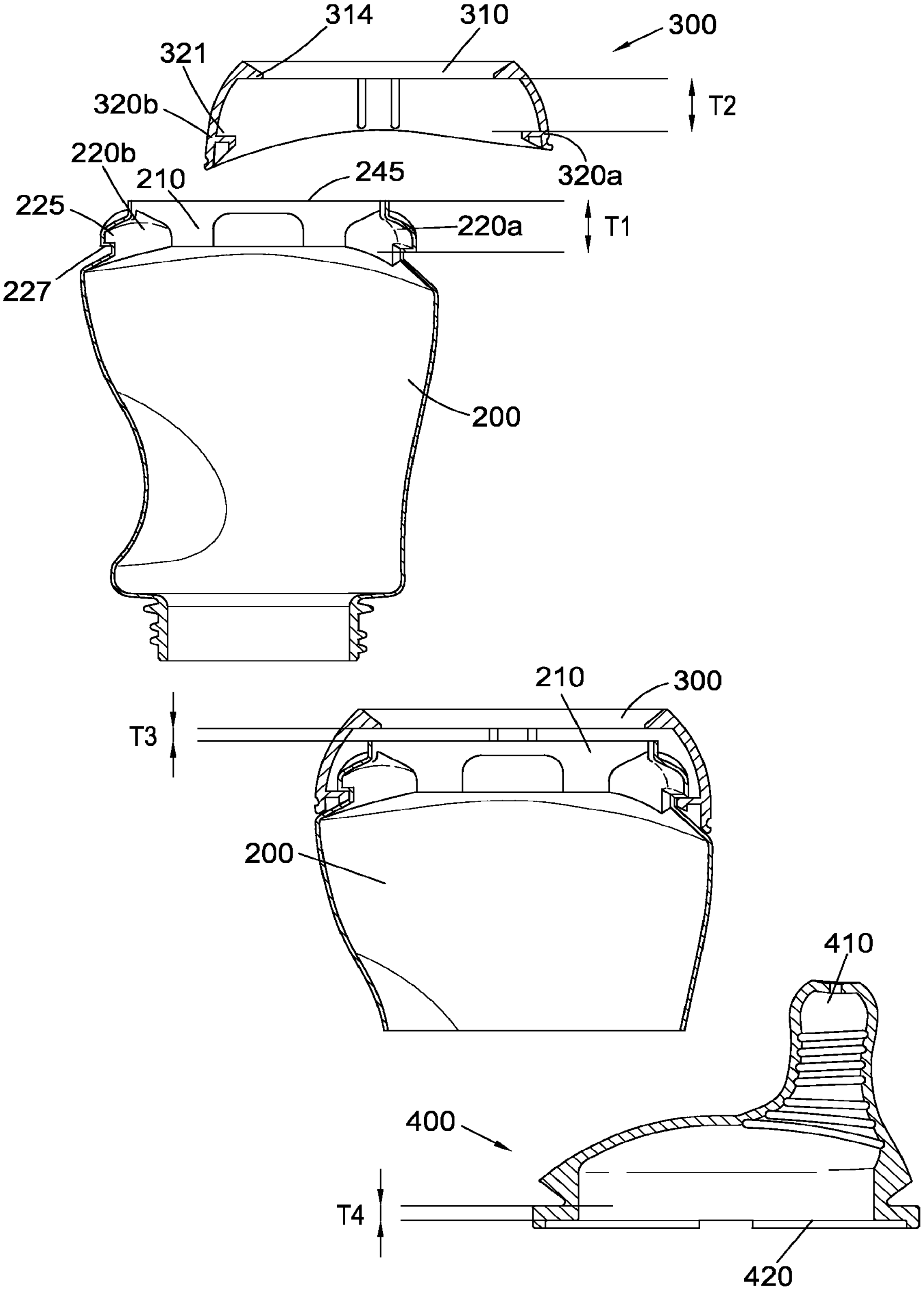
FIG. 5 shows dimensions of a bottle assembly.

In the example of FIG. 5, the vertical difference in height between a) a lower edge 227 of the central portion 225 of the first and second female detent formations 220*a* and 220*b* and b) the rim 245 of the neck 210 is denoted as T1, and the vertical difference in height between a) an upper edge 321 of the first and second male detent formations 320*a* and 320*b* and b) the underside of the rim 314 surrounding the aperture 310 in the collar 300 is denoted as T2. The height available for the annular flange 420, i.e., the difference T2–T1, is denoted as T3. The thickness of the annular flange 420 when it is not compressed is denoted as T4.

In the example of FIG. 5, T1 is approximately 12.5 mm, T2 is approximately 14.5 mm, and therefore T3 is approximately 2 mm. However, the thickness T4 of the annular flange 420 when it is not compressed is 2.5 mm, which is 0.5 mm more than the height available T3. Accordingly, when the collar 300 is snap fitted to the neck 210, the thickness of the annular flange 420 is compressed by approximately 20%. However, in other examples, the thickness of the annular flange 420 may be compressed by an amount in the range R1 to R2 %, wherein each of R1 and R2 is one of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, e.g., within the range 15 to 25%. Of course, the amount of compression need not be an integer, and may be any real number in the range R1 to R2 %. A higher degree of compression will be obtained when the annular flange 420, the collar 300 and/or the neck 210 are made of soft materials.

Figure 6B:
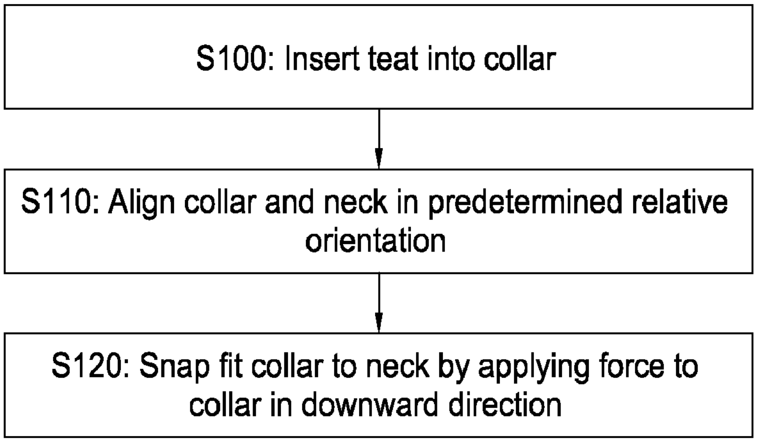
FIG. 6(*a*) shows a flow chart of a method of assembling a bottle assembly.
Figure 6B:
Figure 7A:
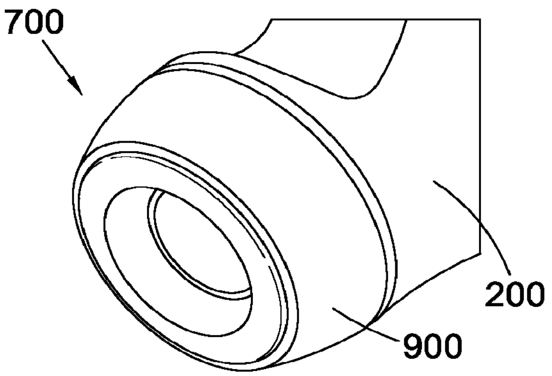
FIG. 7(*a*) shows a perspective view of a valve assembly in an assembled configuration.
Figure 7B:
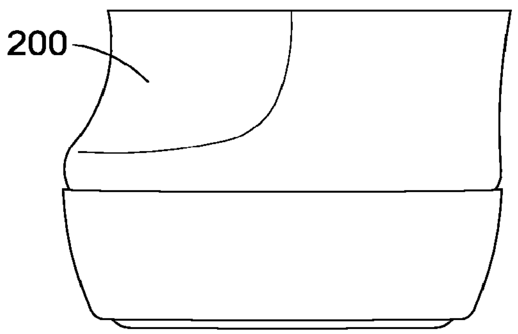
Figure 7C:
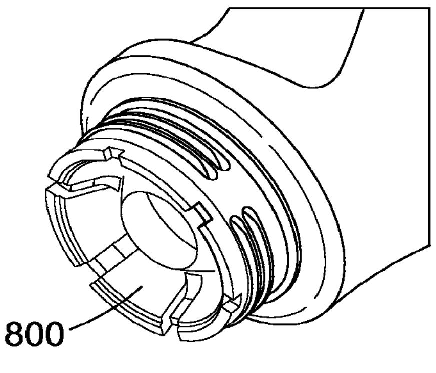
Figure 7D:
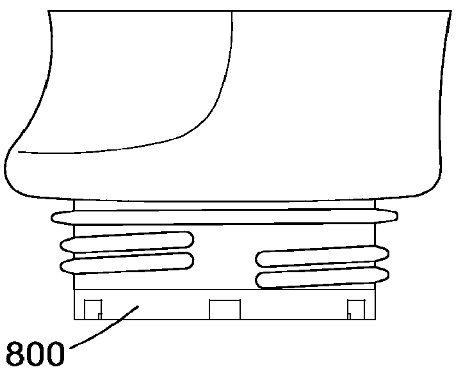
Figure 7E:
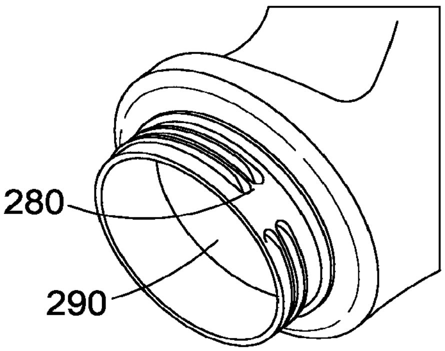
Figure 7F:
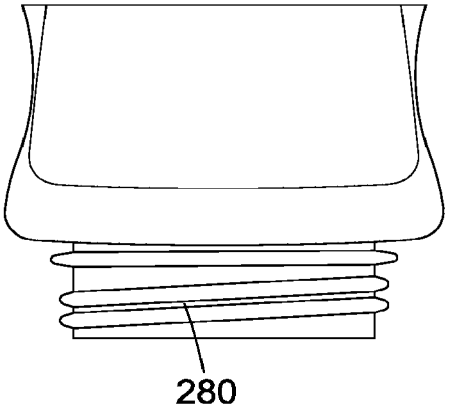
Figure 8A:
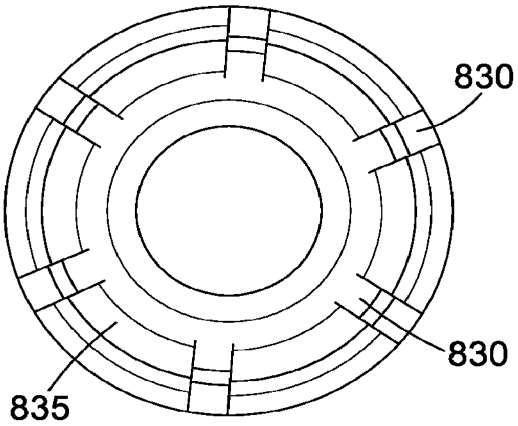
FIG. 8(*a*) shows a bottom view of a sealing member.
Figure 8B:
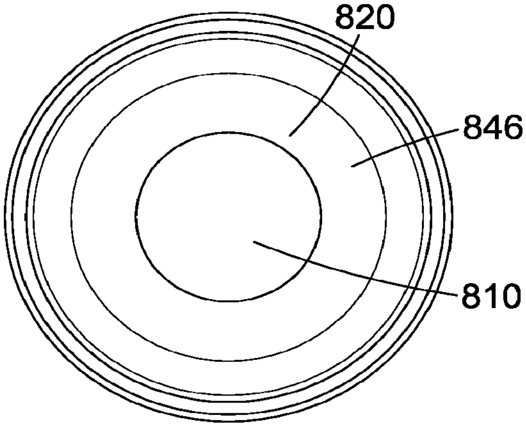
Figure 8C:
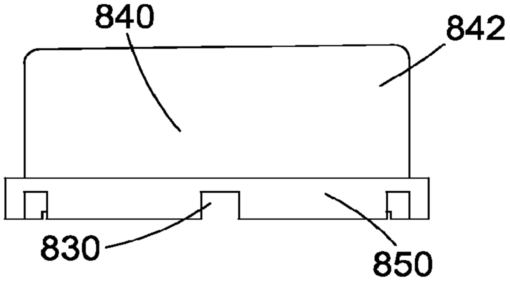
Figure 8D:
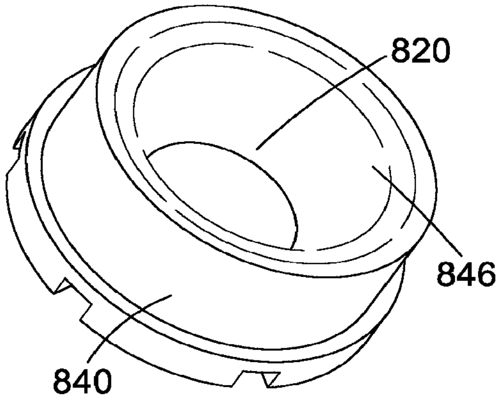
Figure 8E:
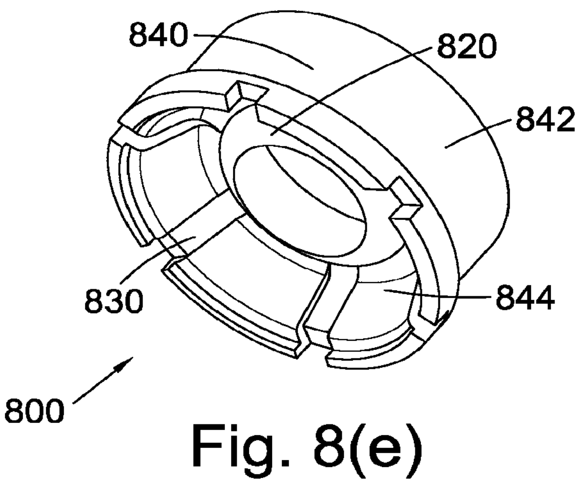
Figure 8F:
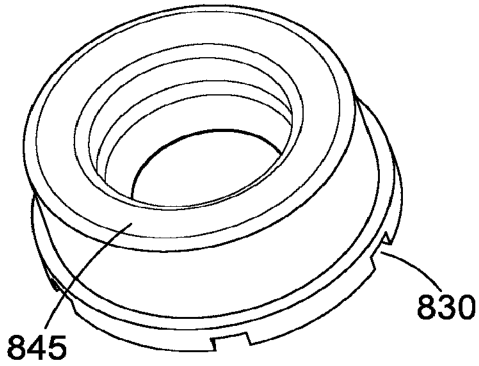
Figure 9A:
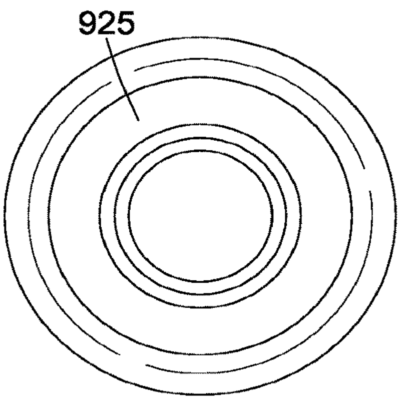
FIG. 9(*a*) shows a bottom view of a base member.
Figure 9B:
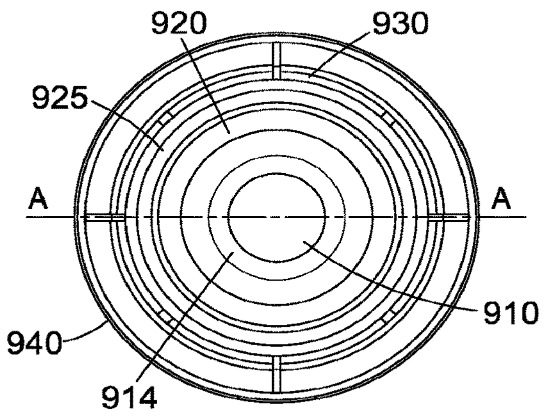
Figure 9C:
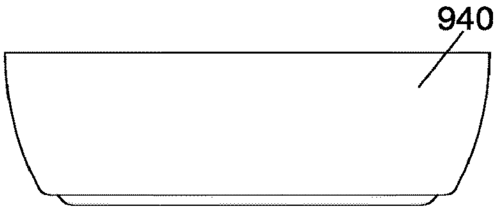
Figure 9D:
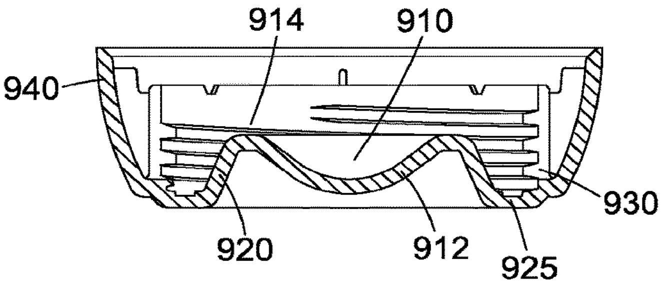
Figure 9E:
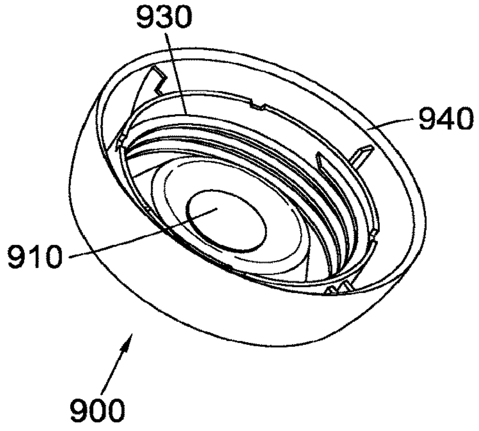

The bottle assembly 100 may be assembled using the method shown in FIG. 6(*a*). In step S100, the teat assembly 400 is inserted into the collar 300. In step S110, the collar 300 and the neck 210 are aligned in a desired predetermined relative orientation.

In step S120, the collar 300 is snap fitted to the neck 210 by applying a force to the collar 300 in a downward direction. As force is applied to the collar 300 in a downward direction, the collar 300 flexes such that the first and second male detent formations 320*a* and 320*b* are respectively able to slide over the upper portions 224 of the first and second female detent formations 220*a* and 220*b*, down the central portions 225, and into the lower, recessed portions 226. By the end of step S120, the first and second male detent formations 320*a* and 320*b* are respectively engaged with the first and second female detent formations 220*a* and 220*b*.

The bottle assembly 100 may be disassembled using the method shown in FIG. 6(*b*). In step S200, the collar 300 is uncoupled from the neck 210 by rotating (or 'twisting') the collar 300 with respect to the neck 210. In particular, as the collar 300 is rotated with respect to the neck 210, the first and second male detent formations 320*a* and 320*b* respectively slide out of the lower, recessed portions 226 of the first and second female detent formations 220*a* and 220*b* via the open sides 222. By the end of step S200, the first and second male detent formations 320*a* and 320*b* are respectively disengaged from the first and second female detent formations 220*a* and 220*b*.

The bottle assembly 100 described herein requires relatively few parts, and may therefore be manufactured inexpensively.

In the above examples, the bottle assembly 100 has been described as comprising first and second female detent formations 220*a* and 220*b* on the neck 210 and first and second male detent formations 320 and 320*b* on the collar 300. However, any number of detent formations could in fact be used at any appropriate orientation or distribution. For example, a single detent formation could be used on each of the neck 210 and collar 300, or four detent formations could be used on each of the neck 210 and collar 300.

With a traditional collar arrangement including a screw thread, the collar and shoulder should be able to rotate freely with respect to each other, in order to enable the collar to be fitted to and removed from the bottle. This is achieved by using a collar with a flat lower edge, and a corresponding bottle shoulder which is also flat, i.e., free of raised sections. In contrast, in the arrangements described herein, it is not necessary to significantly rotate the collar to remove it from the bottle neck, and therefore the lower edge of the collar and the shoulder need not be flat. This allows for considerably more freedom in aesthetic design compared to the traditional collar arrangement.

Alternative bottle assembly arrangements will now be described with reference to FIGS. 13-25 incorporating alternative "push fit" collar arrangements.

Figure 13A:
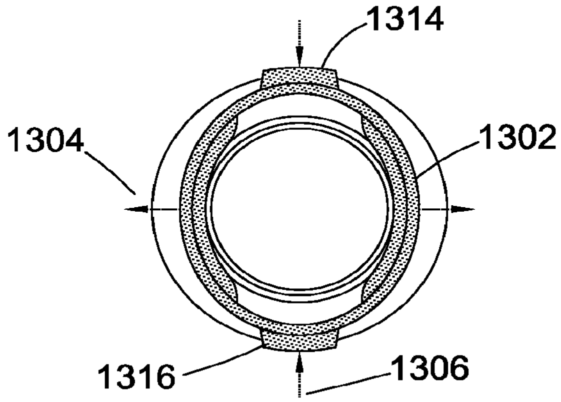
FIGS. 13(*a*) to 13(*f*) show a first variant of a second embodiment of a bottle assembly.
Figure 13B:
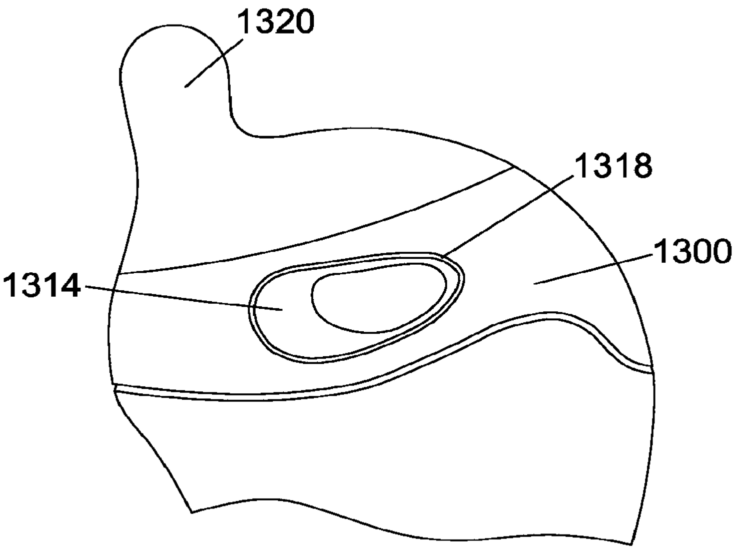
Figure 13E:
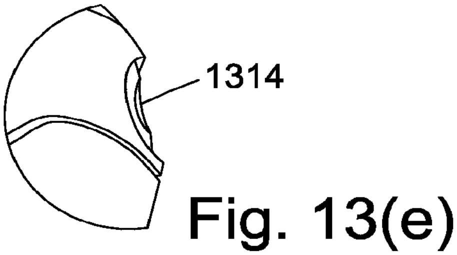
Figure 13C:
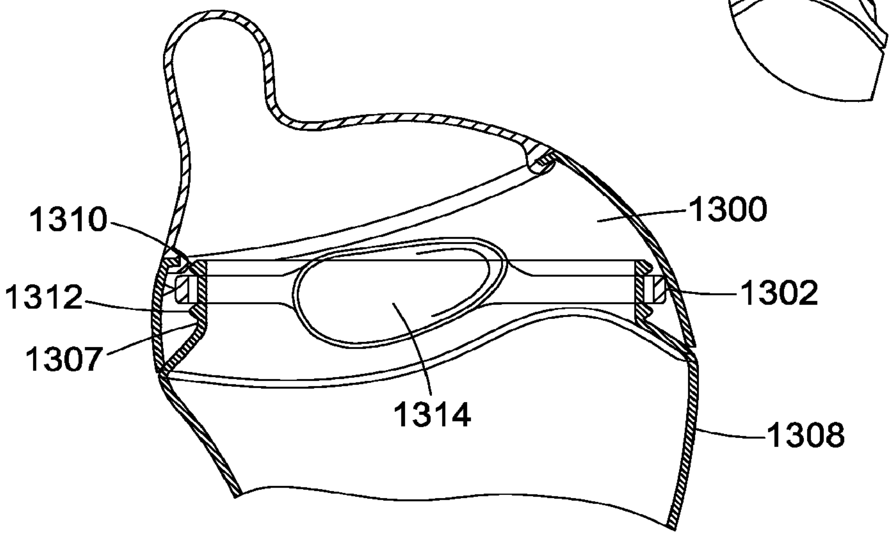
Figure 13F:
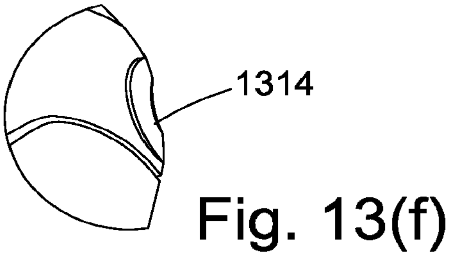
Figure 13D:
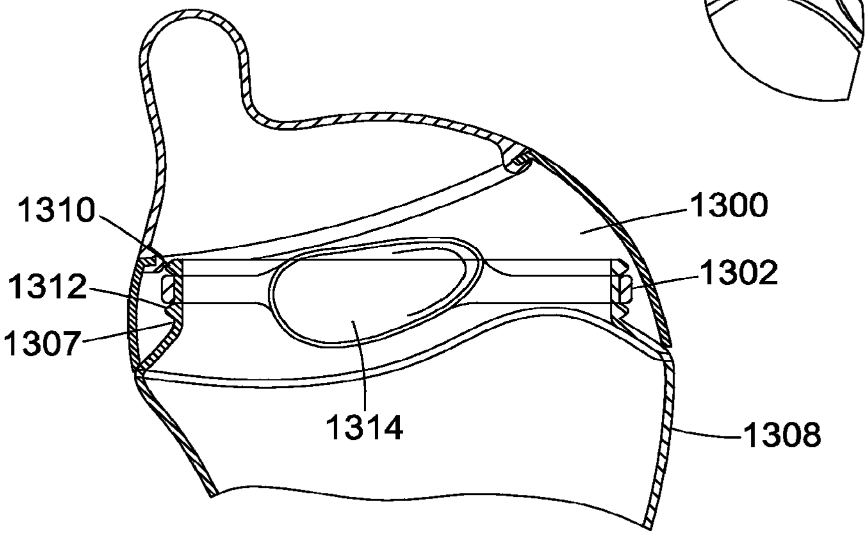
Figure 15A:
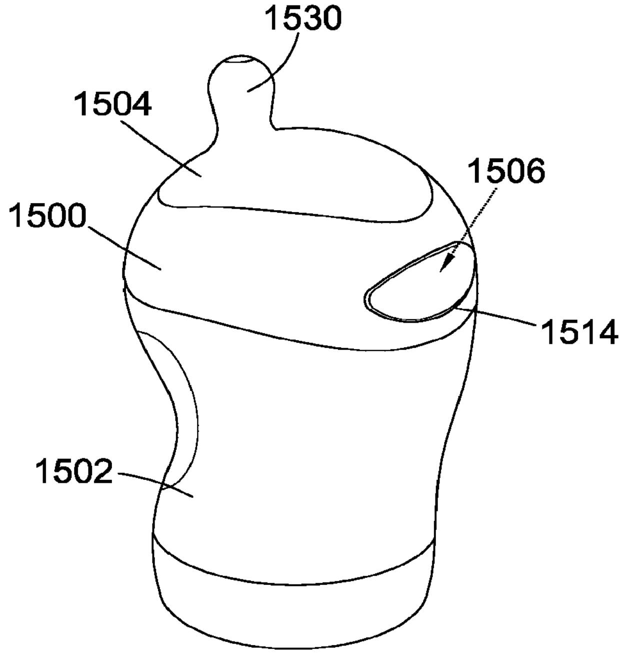
FIGS. 15(*a*) to 15(*d*) show a third variant of a second embodiment of a bottle assembly.
Figure 15B:
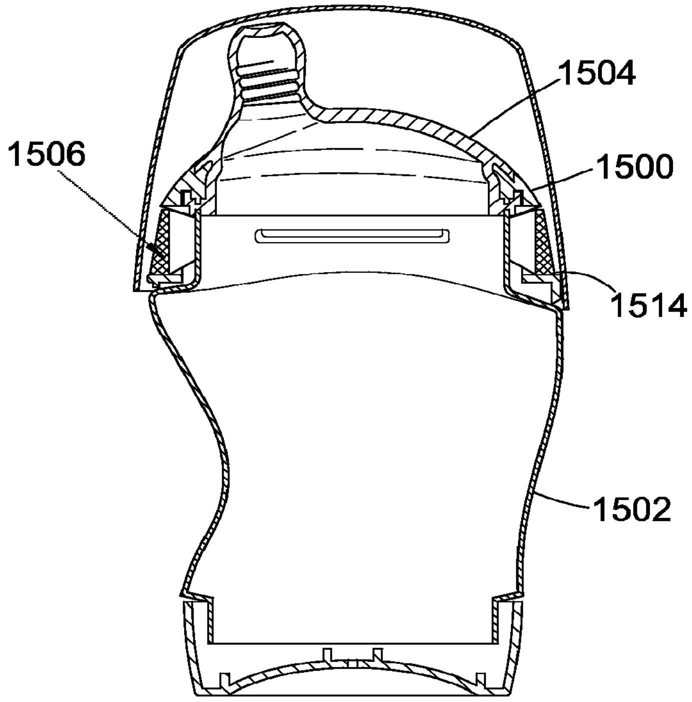
Figure 15C:
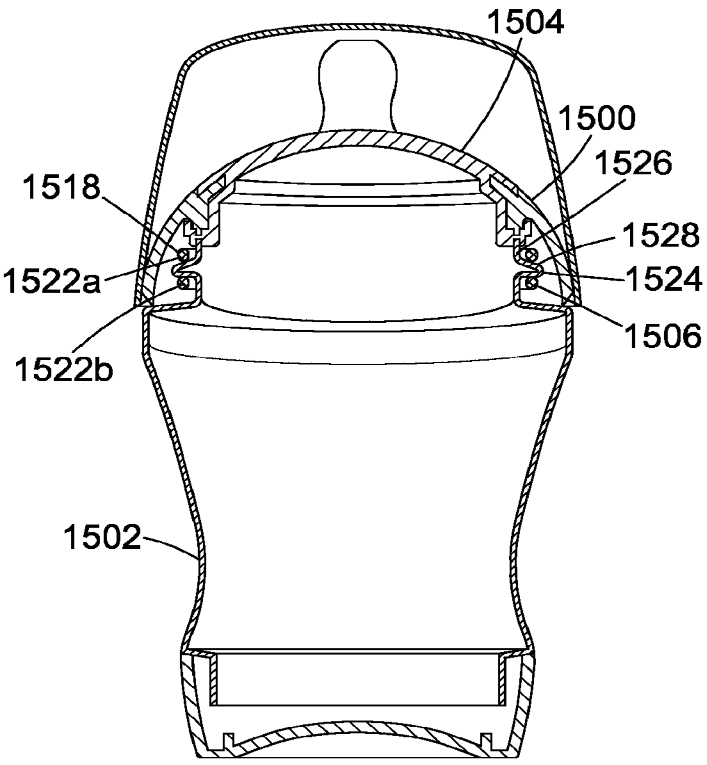
Figure 15D:
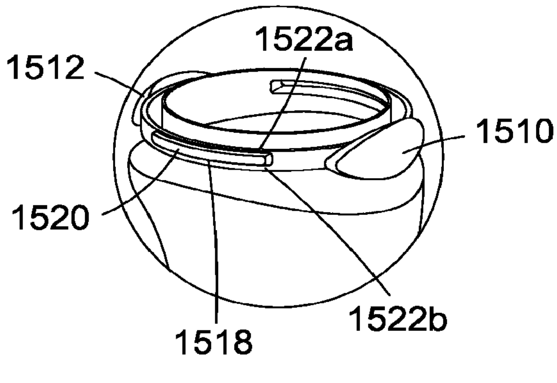
Figure 16A:
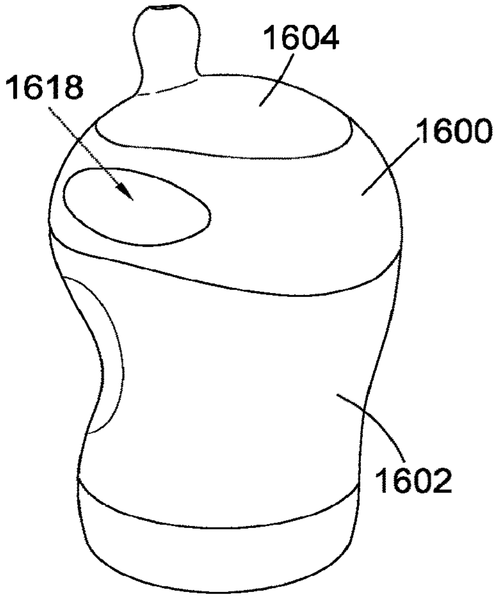
FIGS. 16(*a*) to 16(*d*) show a fourth variant of a second embodiment of a bottle assembly.
Figure 16B:
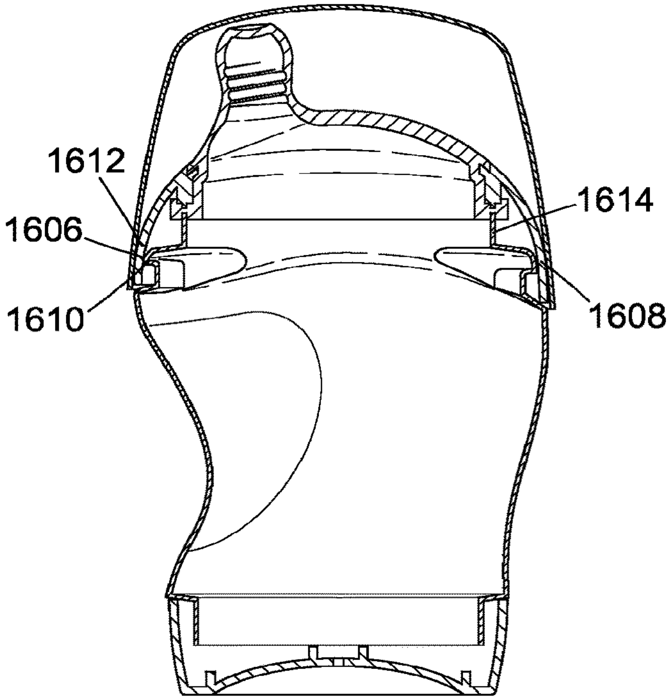
Figure 16C:
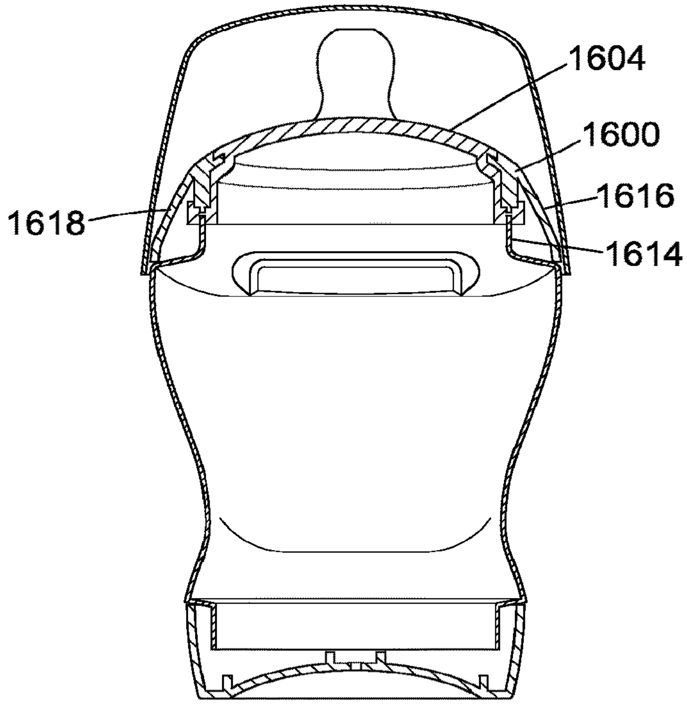
Figure 16D:
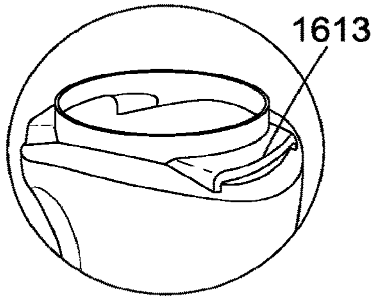
Figure 17A:
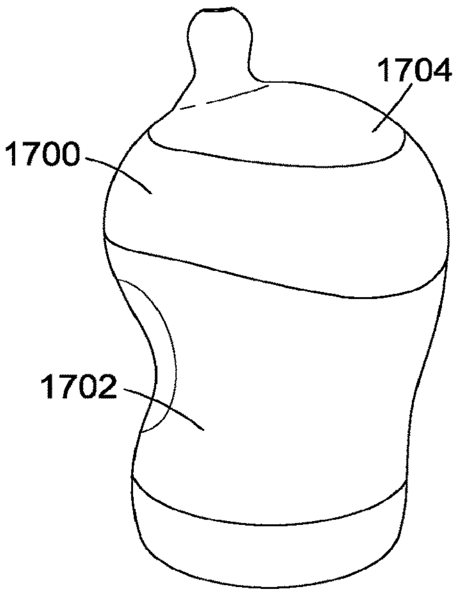
FIGS. 17(*a*) to 17(*d*) show a fifth variant of a second embodiment of a bottle assembly.
Figure 17B:
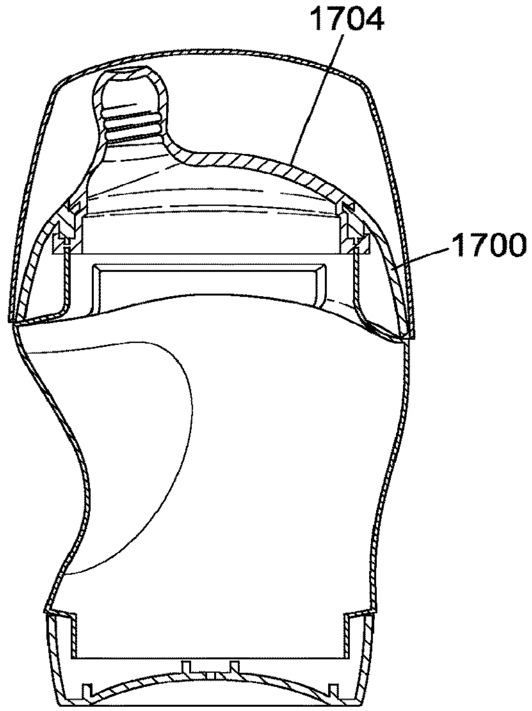
Figure 17C:
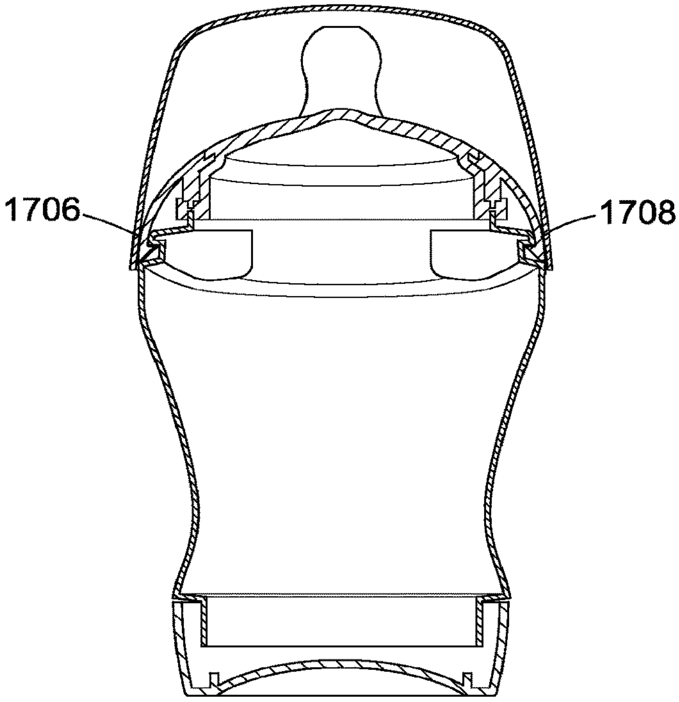
Figure 17D:
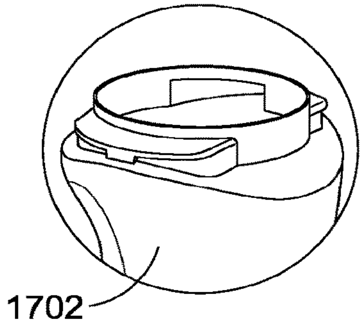

Referring to FIGS. 13*a*-13*f* first variant of a second embodiment is shown in which the collar 1300 includes an oval formation 1302. The oval ring (or 'locking ring') 1302 has a smaller diameter axis 1304 and a larger diameter axis 1306. The ring fits around the neck 1307 of a bottle 1308 and in particular the smaller radius 1304 matches, or for biasing purposes is slightly less than, the neck diameter. The neck includes upper and lower annular flanges, rings, or beads 1310 and 1312, between which the ring sits in its relaxed position. The ring 1302 is formed of any appropriate flexible, resilient, material such as plastics material, such that when it is pressed along its longer axis, the ring bows outwardly along its shorter axis. Thus, as shown in FIG. 13*d*, in a relaxed position the ring 1302 sits between the beads 1310, 1312, but when the ring is squeezed along its longer axis 1306, the shorter axis portions disengage the bottle neck as shown in FIG. 13*c*. The ring 1302 engages the collar 1300 in any appropriate manner. For example in the embodiment shown, along its longer axis the ring carries first and second external buttons 1314, 1316 effectively comprising tabs extending from the external periphery of the ring in the long axis direction. The collar includes correspondingly shaped apertures 1318 (and a second aperture not shown on the opposing side at) 180° through which the buttons or tabs 1314, 1316 extend hence holding the ring in place on the collar 1300. As shown in FIGS. 13*e* and 13*f*, the tabs extend out far enough such that when they are pushed together the ring bows outwardly as described above, but the tabs do not disengage the apertures 1318.

In operation, therefore, the collar 1300 and teat 1320, which can be mounted in the collar by any appropriate means such as being press fit or co-moulded, are placed onto the bottle 1308, with the narrow axis portion of the ring 1302 snapping over the upper bead 1310 by virtue of camming faces and locking between the two beads 1310, 1312 as shown in FIG. 13*d*. To remove the collar and teat, buttons 1314, 1316 are pressed inwardly through apertures 1318 in the collar, bowing the smaller radius portion of the collar outwardly into the unlocked positions shown in FIG. 13*c* after which the collar and teat can be lifted away. It will be seen that the ring 1302 is retained, at least in part, in the collar 1300 because of the distance projected by the tabs 1314, 1316, even in the inwardly pressed position as shown in FIG. 13*e*. Additional retaining means may also be provided on the underside of the collar 1300 to ensure correct location and orientation between the ring 1302 and collar 1300 and to ensure these components behave as a single part to the user. Hence by virtue of the interaction between the narrow radius portion of the collar 1302 and the beads 1310, 1312 acting as detent formation (in particular the upper bead 1310), interacting with the narrow portion of the collar acting as cooperating or complementary detent formation, the collar can snap fit onto the neck by application of force only in a downward direction, and can be removed by pressing along the long axis and applying upward force. According to a second variant of the second embodiment as shown in FIGS. 14*a* to 14*d*, a similar arrangement including collar 1400, bottle 1402 and teat 1404 is provided. As will be seen for example from FIG. 14*b*, the collar 1400 and teat 1404 together form a co-moulded or bi-injection cap, the teat being of a relatively flexible material and the collar surrounding the lower portion but forming an aperture 1401 through which the teat material extends forming a flexible button portion. The cap also includes a locking ring 1408 once again of oval configuration as described above with relation to the first variant and which is arranged to snap over a bead or detent formation 1410 on the bottle neck 1412. The bead 1410 has a sloped upper face providing a cam surface for the locking ring 1408 to snap over and lock underneath in retaining recess 1416 which can be seen on bottle neck 1412 in FIG. 14*d*.

Locking ring 1408 includes retaining feature 1420 at its larger radius axis. Retaining feature 1420 comprises a segment 1422 which abuts against flexible portion of the teat 1404 acting as a button 1406 as described above. The retaining portion 1420 further includes a radially inwardly projecting arm 1424 which projects through an aperture 1414 in the locking ring into an eyelet or aperture in a downwardly projecting flange of the collar portion. As a result the locking ring 1408 is confined within the collar 1400 both against being dislodged and against radial movement.

Because of the flexible nature of the locking ring and of the exposed portion of the teat material acting as a button 1406, when pressure is applied to the button 1406 it presses against segment 1422 of the retaining feature 1420 and hence pushes the longer axis portion of the locking ring 1408 inwardly which, in a manner similar to the first variant, causes the smaller radius portion of the locking ring 1408 to bow outwardly permitting release from underneath the detent formation 1410. It will be noted that buttons 1406 can be provided at both opposing sides of the collar portion to provide symmetry in any bowing or deformation of the locking ring, enhancing reliability.

In operation, the locking ring acts as a complementary detent formation, and as a downward force is applied to the collar it rides over the bead or detent formation 1410 on the bottle neck and locks into place in the retaining recess 1416 below the bead 1410. To release the collar and teat, pressure is applied to the or each "button" 1406 which, by virtue of the flexibility of corresponding teat material in the cut out aperture of the collar, pushes the larger radius portion of the locking ring inwardly, bowing the smaller portion of the locking ring outwardly, allowing release from underneath the bead 1410 and removal of the cap.

A third variant of the second embodiment is shown in FIGS. 15*a* to 15*d* including a collar 1500, a bottle 1502 and a teat 1504. Once again an oval locking ring 1506 is provided in a similar manner to the first and second variants described with reference to FIGS. 13 and 14. As described with regard to the embodiment in FIG. 13, the ring includes button or tab portions 1510, 1512 (shown in FIG. 15*d*) at its longer axis ends which extend through corresponding apertures 1514 in the collar 1500. This serves to retain the locking ring 1506 in the collar and when pressure is applied causes the narrower axis formations 1518 to bow outwardly. As can be seen for example from FIG. 15*d* and FIG. 15*c*, the narrower axis portions 1518 of the locking ring 1506 each include an elongate aperture 1520 around a portion of the circumference effectively forming upper and lower arms 1522*a*, 1522*b*. A bead or detent formation 1524 extends around the neck 1526 of the bottle 1502 and has an angled upper surface 1528. This permits the locking ring to slide or snap over the detent formation 1524 such that the detent formation 1524 is held captive between the upper and lower portions 1522*a*, 1522*b* of the locking ring, in the aperture formed therein, 1520. The detent formation 1524 and the bottle neck preferably extend circumferentially for an approximately equivalent distance to the aperture 1520 in the locking ring 1506.

In operation, as the collar and teat are pushed downwardly the locking ring 1506 spreads outwardly over inclined surface 1528 of bead 1524 at its lower arm 1522*b* and snaps over into engagement with the bead 1524 and apertured arm 1522*a*, 1522*b* acting as first and second complementary detent formations to snap fit in position. To release the collar and teat, buttons 1514 are pressed inwardly, bowing the smaller radius portion of the locking ring 1506 outwardly permitting release of the bead of detent formation 1524.

It will be noted that in the embodiment of FIG. 15, the long axis of the locking ring, and the buttons, are generally aligned at one side with the off-centre position of the teat portion 1530 as compared to the positioning in relation to FIGS. 13 and 14 in which the long axis is orthogonal to the eccentric axis of the teat portion. It will be appreciated that either configuration can be adopted in relation to any of the embodiments; aligning the elongate axis with the eccentric axis of the teat as shown in FIG. 15 can provide more space for the buttons 1510, 1512 to deform the locking ring while maintaining a large neck diameter. Having a large neck diameter makes it easier to clean the inside of the bottle.

Referring now to FIG. 16 a fourth variant of the second embodiment is shown. In this variant, in general terms, the locking ring effectively is formed integrally with the collar 1600 which is press fit, co-moulded or otherwise attached to teat 1604 and snap fit by virtue of a downward force only onto bottle 1602. Referring to FIGS. 16*b* and 16*d* the smaller diameter portion of the collar 1606, 1608 includes an inner bead or detent which slides over an inclined surface 1612 of a detent formation 1613 on bottle neck 1614 and locks underneath it. The collar is of deformable material and seals the teat 1604 against the bottle neck 1614 by compression when it is snap fit in place as described in relation to embodiments above. When an inward force is applied to the larger diameter portions of the collar acting as locking ring, 1616, 1618 the smaller diameter portion 1606, 1608 bow outwardly releasing the detent formation on the collar from the underside of the detent formation 1613 on the bottle and allowing the cap including the collar 1600 and teat 1604 to be lifted off.

A fifth variant of the second embodiment is shown in FIGS. 17*a* to 17*d* and similar to the fourth variant provides the oval locking ring integrally with the cap 1700 which snap fits to bottle 1702 and confines teat 1704 as described above. Operation and configuration is generally in accordance with the embodiment described above in relation to FIG. 16 except that the oval configuration of the collar is rotated through 90° with reference to the off-axis position of the teat; in FIG. 16 the smaller diameter axis of the collar 1600 is aligned with an axis joining the teat and a general vertical centre line of the bottle 1602 whereas in FIG. 17 the longer oval axis (joining point 1706 to point 1708) is aligned with the axis joining the teat and the vertical centre line of the bottle. As a result of the ranging in FIG. 17, once again a larger release button area is provided.

For each of the variants of the second embodiment, the locking ring and detent are located in such a way as to provide a constant compression force when in operation, which seals the open end of the bottle. In particular, in FIG. 14, the hard collar material presses against the bottle, while in FIGS. 15 to 17, the flexible teat material is compressed in between the bottle and the collar.

Figure 18A:
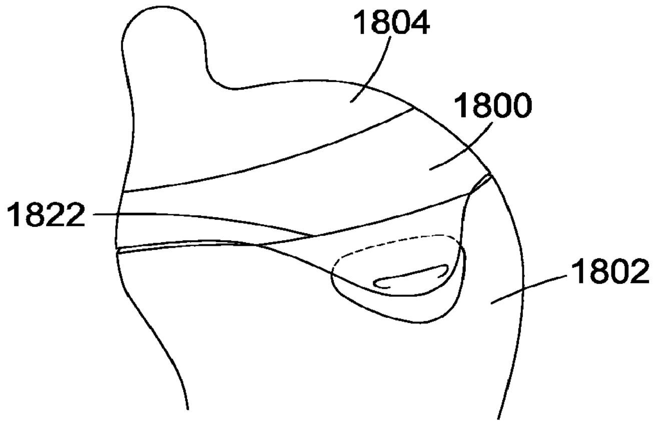
FIGS. 18(*a*) to 18(*c*) show a first variant of a third embodiment of a bottle assembly.
Figure 18B:
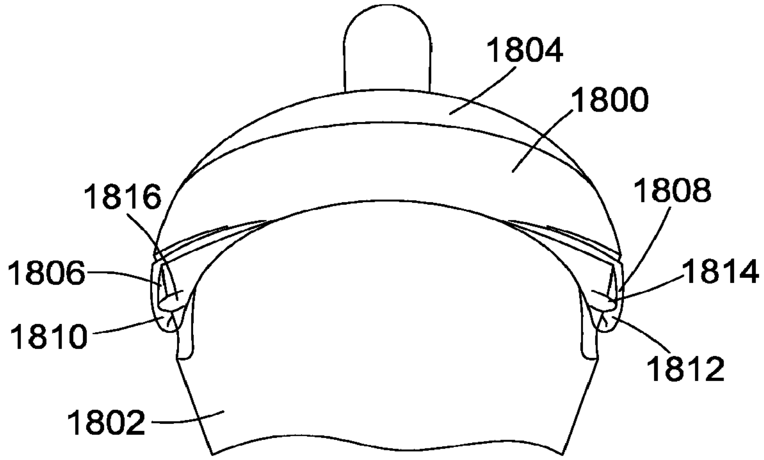
Figure 18C:
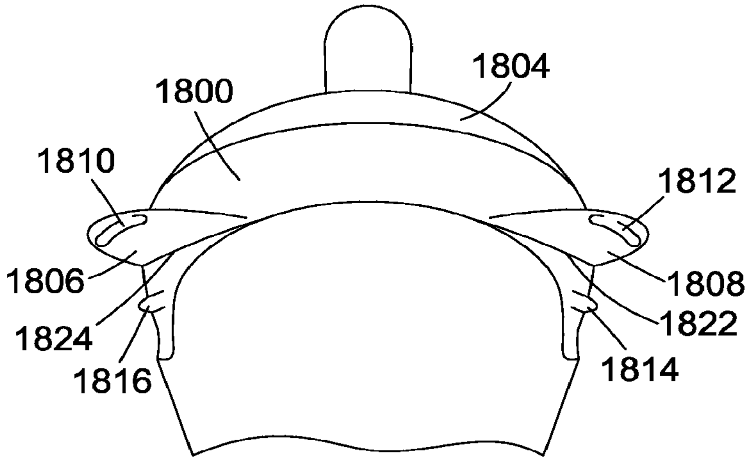

A first variant of a third embodiment of the snap fit concept is shown in FIGS. 18*a* to 18*c*. According to the third embodiment, the collar is arranged to snap fit to a bottle neck by engagement of detent formations which are released by virtue of a hinging arrangement.

Referring to FIG. 18, a first variant is shown in which a collar 1800 and teat 1804 snap fit to a bottle 1802. The collar and teat can be formed in any of the manners discussed above including press fitting or co-moulding. Referring to FIGS. 18*b* and 18*c*, the collar 1800 includes hinged flaps or protrusions 1806, 1808 at opposed lower ends. In a closed configuration, the flaps extend generally downwardly and in conformance with the profile of the collar 1800 as shown in FIG. 18*b*. In an open configuration, the protrusions 1806 and 1808 extend outwardly, for example, perpendicularly outwardly. The flaps include detent formations or protrusions on the inside/underside as shown at 1810, 1812. The bottle 1802 also includes detent formations extending in the vicinity of its shoulder generally outward at 1814, 1816. However, in other examples, the detent formations 1814, 1816 could be located at any position on the outer surface of the bottle 1802. The detent formations comprise projections which are generally aligned when a collar is placed on the bottle and which have a curved profile in cross section, as can be seen in, for example, FIG. 18*b*, permitting them to slide over one another. The detent formations 1814, 1816 on the bottle may have a curved upper surface allowing a sliding motion, but a squared off lower surface preventing accidental detachment, and in the same manner the detent formations 1810, 1812 on the collar portion may have lower curved projections allowing sliding motion but upper squared off portions, again preventing accidental decoupling.

In operation, the flaps on the lid are flipped to the downward or closed position such that, when the collar 1800 is then pressed down onto the bottle, the detent formations 1810, 1812 on the flaps slide over the detent formations 1814, 1816 on the bottle and lock below them. This snap fits the collar 1800 to the bottle and prevents upward motion, thereby sealing the open end of the bottle. To remove the cap the flaps 1806, 1808 are flipped upwardly about their hinges permitting detachment from the detent formations 1814, 1816 on the bottle and simple removal of the cap. The flaps are hinged at hinges 1822, 1824 in any appropriate manner to the remainder of the collar portion; for example, by providing "living hinges" that are weakened, or flexible portions between the flaps and collar portion. As a result, the collar 1800 can be snap fitted onto the bottle 1802 by application of force only in a downward direction, relying on engagement to the detent formations for positive engagement and retention. The collar 1800 can then be simply removed by flipping up the flaps and lifting the collar 1800 and teat 1804 off.

A variant of the arrangement shown in FIG. 18 is provided in FIG. 19. According to this embodiment, instead of providing a collar portion separate from or integrated with the teat portion, the collar forms part of the material of the teat portion but provides stiffened sections or beads 1900 acting as detent formations. In particular, the teat portion 1904 is formed of generally flexible material and stretches over the top of the bottle 1902 to keep it in place. Stiffened detent portions 1900 can extend all the way around the teat for stiffening purposes, or can extend only in the region of the corresponding detent recesses 1906 in the neck 1910 of the bottle 1902.

Figure 19A:
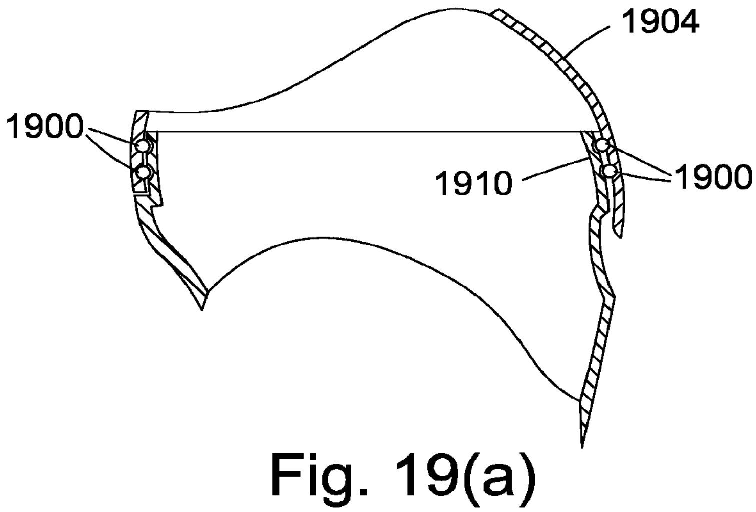
FIGS. 19(*a*) to 19(*c*) show a second variant of a third embodiment of a bottle assembly.
Figure 19B:
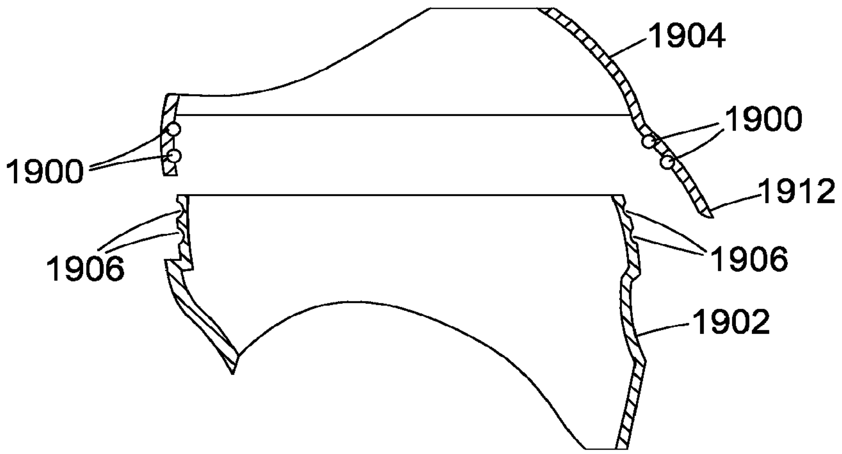
Figure 19C:
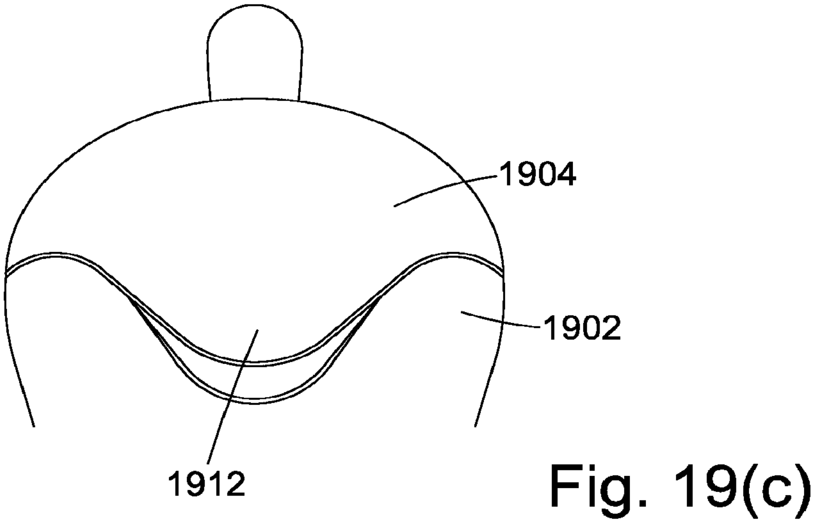

As shown in FIG. 19*a*, when the teat is pressed down onto the bottle, the teat detent formations 1900 slide over and into the corresponding detent recesses 1906 in the bottle, locking the teat in place. A single or multiple beads can be provided for both security and improved sealing, and corresponding recesses can be provided extending circumferentially around the bottle neck, for example. When it is desired to remove or release the teat 1904, it can be removed simply by virtue of the flexibility of the teat material. For example, a lower portion of at least one side of the teat portion can extend below the general profile of the teat and form a tab 1912 as shown in FIG. 19*b* and FIG. 19*c*. This can be simply lifted up and away from the bottle portion to release the detent formations of beads 1900 from the corresponding detent recesses 1906. Hence the collar and teat portion can snap fit to the neck 1910 by engagement of the detent formations by application of force only in a downward direction whilst permitting simple removal by releasing the detent formations by lifting the tab 1912.

According to a third variant of the third embodiment as shown in FIGS. 20*a* to 20*d*, a full teat body incorporating both the teat and collar profiles is provided in a similar manner to FIG. 19 as shown at 2004. As with FIG. 19, the body can be a silicone main body and can be provided with one or more circumferential ribs made of stiffer material 2006 at the lower end. The rib 2006 includes first and second beads 2008 extending circumferentially around the inside of the teat. The beads 2008 are separated vertically and provide detent formations which can lock into corresponding detent recesses 2010 extending around the outside of the body of the bottle 2012. As a result, the teat 2004 can be pushed down and snap fit onto the bottle body 2012 by engagement of the beads 2008 with corresponding detent recesses 2010. The rib 2006 additionally includes a keying feature 2014 comprising an inward projection of the corresponding stiffer material at at least one circumferential portion of the teat and arranged to mate with a corresponding shaped recess 2016 in the neck of the bottle 2012. This allows central location of the teat 2004 so that the beads 2008 align correctly with the detent recesses 2010 even if the detent recesses 2010 are of non-planar profile but instead, for example, as shown in the Figures, curve upwardly from a lowest extension.

Additionally, a front tab 2018 is formed as an extension of the rib 2006 at a location, in one embodiment, generally opposed to the provision of the formation 2014. This includes an outwardly projecting portion 2020 which can be lifted up and away from the bottle 2012, releasing the beads 2008 from the corresponding detent recesses 2010, and hence allowing the teat 2004 to be pulled away easily from the bottle 2012. As a result, the teat and collar arrangement can be snap fit onto the neck by downward force application only and can be simply released by pulling the tab 2020 away from the bottle.

A fourth variant of the third embodiment is shown in FIGS. 21*a* to 21*d*. In a similar manner to the second and third variants, the teat and collar are formed integrally of generally common material but with a rib 2106 including a tab 2120 and, on the opposing side, a keying formation 2114. The rib 2106 further includes a generally circumferential inwardly projecting ridge 2108 which acts as a detent formation engaging within the corresponding profiled detent recess 2110. Both the ridge 2108 and the recess 2110 can be, for example, of rectangular cross-section.

Once again the teat 2104 can thus be snap fit onto the bottle 2102 by downward force and engagement of the corresponding detent formations. By pulling the tab 2120 away, in a similar manner to the third variant described with reference to FIG. 20, the detent formations can be disengaged and the cap removed. Additionally it will be noted that the bottle 2102 further includes an upward cylindrical rim 2116 which projects, in the closed configuration shown in FIG. 21*b*, into a corresponding cylindrical recess 2118 in a downwardly facing portion of the teat 2104, providing an improved sealing interface when the bottle 2102 is in the closed position.

For each of the variants in FIGS. 18-21, the detent formations are stiffer than the teat portion and may comprise one or a combination of (i) a plastic material, (ii) a harder grade of the same material of the teat portion, (iii) an alternative material to the teat portion with greater resistance to stretching, or (iv) the same material as the teat portion suitably thickened to increase stiffness.

In each of the variants in FIGS. 18-21, as well as preventing accidental decoupling of the collar portion and the bottle, the detent formations and the collars combine with the teat to provide a sealing force to seal the opening of the bottle. The sealing force relies at least in part on tension in the material of the teat and collar parts, and this can be tuned or modified by suitable construction of the component features. For example, in each variant any of the parts that may be made from stiffer material may be moulded as a single part, or they may be discrete from each other and attached only to the flexible material. Therefore, to enhance stiffness, the detent formations may be moulded as a unitary piece with the associated collar, flaps and tabs. Alternatively, one or more of these features may be moulded as discrete from the others, to provide local regions of slightly increased flexibility which would modify, for example, the sealing tension, the movement of tabs or the ease of engagement of the snap fit action.

According to a fourth embodiment, the teat assembly and collar snap fit to the neck by engagement of detent formations when a downward force is applied, and the detent formations are released allowing removal of the cap by application of a force on a portion of the collar, causing the detent to swing or pivot outwardly and disengage the neck detent.

Figure 22A:
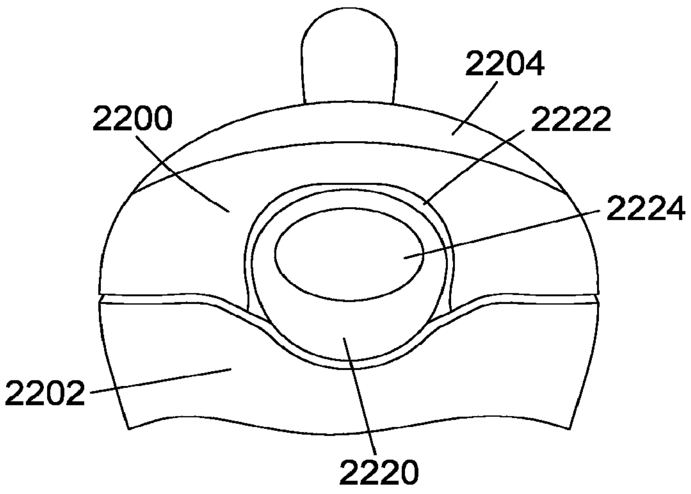
FIGS. 22(*a*) to 22(*d*) show a first variant of a fourth embodiment of a bottle assembly.
Figure 22B:
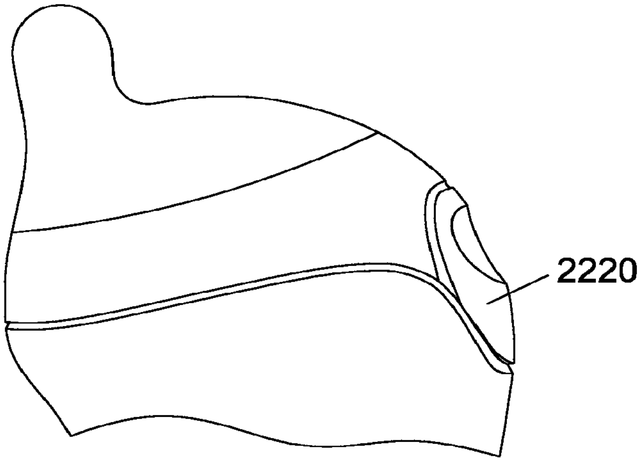
Figure 22C:
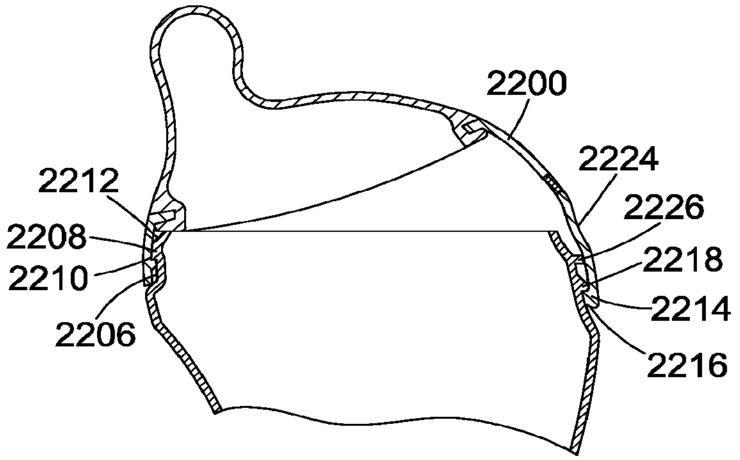

A first variant of the approach is shown in FIGS. 22*a* to 22*d*, in which a collar 2200 snaps fits to a bottle 2202 and incorporates, in any of the manners described herein, a teat 2204. As can be seen from FIG. 22*c*, the bottle 2202 includes a neck 2206 which includes a rib or detent formation 2208 having a generally square underside 2210 and an angled upper side 2212. The collar 2200 similarly includes a detent formation 2214 comprising a rib extending circumferentially all around it, or at least in the vicinity of a correspondingly limited detent formation 2208 on the bottle neck 2206. The detent formation 2214 on the collar 2200 includes an angled lower surface 2216 and a generally squared off upper surface 2218. As shown in FIG. 22*c*, therefore, the collar 2200 and teat 2204 can slide onto the bottle 2202 and the respective detent formations slide over one another and then snap into a locked position.

The collar further includes a button or tab 2220, as shown in FIG. 22*a*. The button 2220 is able to flex or move relative to the collar 2200 by virtue of a living hinge or other assembly. In the embodiment shown, a co-moulded portion 2222 of flexible material such as TPE is provided around the button to mount it to the collar 2200 such that it can flex relative to the collar 2200. The button 2220 includes an indentation at an upper portion 2224 and the detent formation 2214 is provided at a lower portion of the button 2220.

Figure 22D:
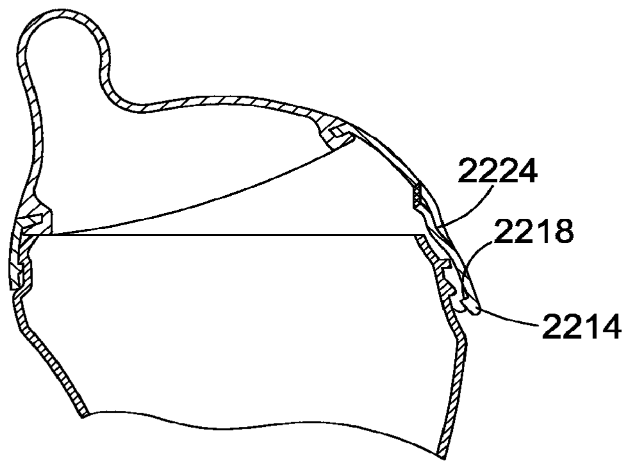

Referring once again to FIGS. 22*c* and 22*d* it will be seen that the bottle neck 2206 includes an additional formation 2226 extending from the neck 2206 above the detent formation 2208 on the neck 2206. The formation 2226 acts as a pivot point and is generally located, when the collar 2200 is positioned on the bottle 2202, between the collar detent portion 2214 and the indented portion 2224 of the button. As a result, when pressure is applied inwardly at the indented portion 2224, this creates a pivoting action of the lower portion of the button 2220 around the pivot point 2226, causing the collar detent portion 2214 to swing outwardly and disengage or unclip from the corresponding detent portion 2208 of the bottle 2202, as shown in FIG. 22*d*.

As a result, the collar 2200 snap fits to the neck 2206 by application of the downward force, and can be released by pressing the button 2220 which pivots the clip out of the way of the bottle 2202 and allows the cap to be removed.

A second variant of the fourth embodiment is shown in FIGS. 23*a* to 23*d*. A cap comprising a collar 2300 and a teat 2304, which can be attached in any appropriate way (for example, by bi-injection), snap fits to a bottle 2302. In a similar manner to the first variant, the collar 2300 includes internal detent formations 2306, 2308 at opposed sides which lock under corresponding detent formations 2310, 2312 projecting outwardly from the bottle outer surface. The detent formations 2310, 2312 of one possible arrangement of this variant can be seen in more detail in FIG. 23*d* as comprising raised ridges on a shoulder portion of the bottle neck 2314 with underhangs into which the detent formations on the inside of the collar 2300 clip or lock. To release the collar 2300, a release button 2316 is provided which can flex relative to the remainder of the collar 2300 by virtue of the inherent flexibility of the material or any other appropriate means as discussed with reference to FIG. 22. When an inward force is applied at the button 2316, which is located above the collar detent formation 2308, the lower lip of the collar 2300 pivots or flexes outwardly around the bottle neck detent formation 2312 allowing release of the detent formation 2308 and removal of the cap.

As a result, the collar 2300 can be snap fit to the neck 2314 of the bottle 2302 by downward force only, and can be released by actuation of the button 2316 and pivoting of the detent formation out of engagement.

A third variant of the fourth embodiment is shown in FIGS. 24*a* to 24*d*. In a similar manner to the first and second variants, the collar 2400 and teat 2404 clip or snap fit to the bottle 2402 by engagement of detent formations on opposite sides of the bottle neck 2406. A button clip or tab 2408 including a pressure application area 2410 is provided in a similar manner to the first variant described with reference to FIGS. 22*a* to 22*d* and pivots the lower part of the clip or tab outwardly when pressure is applied, acting as a lever, by pivoting around a portion of the bottle neck 2406. As a result, a detent formation 2414 on the inside of the lower end of the clip 2408 disengages corresponding recess 2416 in the bottle 2402 allowing the cap to be removed.

The opposing detent recess 2418, which can be seen in FIG. 24*c*, engages a corresponding detent formation 2420 projecting inwardly from the opposing sides of the collar 2400. FIG. 24*d* shows the detent recess 2416 in the bottle 2402 in more detail. In particular, it will be seen that this arrangement provides an increased button lever length to ensure good clearance from the bottle 2402 when the pivoting force is applied and, as a result, the collar 2400 snap fits to the neck 2314 by application of force downwardly, and disengages through simple actuation of the pivot button 2408.

Figure 25A:
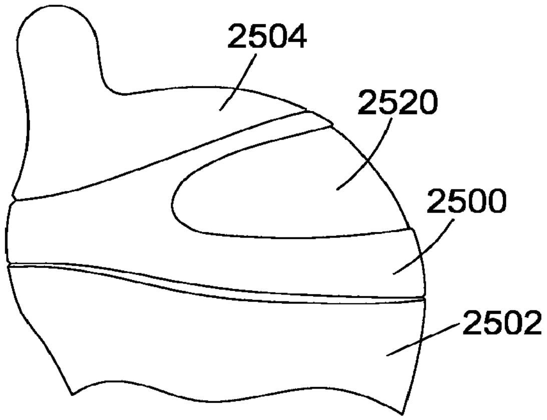
FIGS. 25(*a*) to 25(*c*) show a fourth variant of a fourth embodiment of a bottle assembly.
Figure 25B:
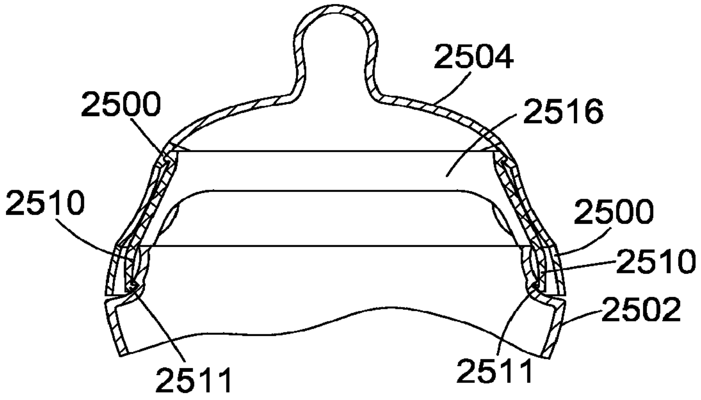
Figure 25C:
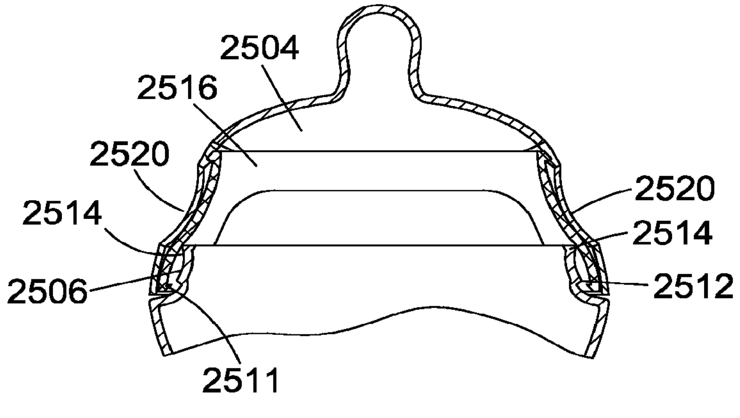

A fourth variant of the fourth embodiment is shown with reference to FIGS. 25*a* to 25*c*. In a similar manner to the first and third variants, the collar 2500 snap fits to a bottle 2502 by engagement of detent formations, in this embodiment at opposing sides of the bottle neck 2506, and a dual pivot force is applied to a button or buttons above the detent formations to swing them outwardly, permitting removal of the cap.

The particular configuration of the collar 2500 and teat 2504 can be understood, for example, with reference to FIGS. 25*b* and 25*c*. An aperture extends around approximately half the circumference of the collar 2500, and is covered by a button portion 2520 of flexible material. A ring (or 'locking ring') 2516 is located with, or mounted to, the inside of the collar 2500, in a similar manner to FIG. 13. The ring 2516 fits around the neck 2506 of the bottle 2502, and includes inwardly and downwardly projecting flanges 2510 at diametrically opposite sides. Each of the flanges 2510 extends behind the button portion 2520 and terminates in a detent formation, flange or bead 2511 which engages the corresponding detent formation 2512 projecting outwardly from the bottle neck 2506, in a similar manner described in relation to other embodiments. The bottle neck 2506 further includes opposed pivot points 2514 comprising radial projections at the top of the bottle neck 2506. The ring 2516 is made from a resilient, generally flexible material, such that if pressure is applied above the bottle neck 2506 (for example, by squeezing opposing sides of the button portion 2520), then the ring 2516 can be deformed slightly. In particular, the upper portions of the projecting flanges 2510 will be pressed inward and the lower portions of the projecting flanges 2510 will flex or pivot outwardly about the pivot point 2514 on the bottle neck 2506, thereby unclipping from the bottle 2502.

The collar 2500 may be made of a rigid material. The button portion 2520 may be made of the same flexible material as the teat 2504, and both may be co-moulded to the collar 2500. However, it is equally possible for one or both of the button portion 2520 and the teat 2504 to be moulded separately and assembled into the collar 2500. As a result, the collar 2500 can snap fit to the neck 2506 by downward force, but can be removed by simple release by pivoting of the collar 2500 as described above.

The end portion of the bottle 200 may comprise a neck portion or a base portion to which the collar is arranged to snap fit. The end portion need not be located at the shoulder of the bottle 200, or at the extremity of the bottle 200, and may instead be located closer to the centre of the bottle 200, as in the examples of FIG. 18.

Valve Assembly

FIGS. 7(*a*) to 7(*f*) show a valve assembly 700 at the base of the bottle 200. When the valve assembly 700 is combined with the bottle assembly 100 as described above, the bottle 200 is open-ended at both ends.

Valve assembly 700 comprises a base member (or 'base') 900 and a sealing member (or 'sealing ring', 'annular sealing member', 'cylindrical sealing member') 800 having complementary shapes. The base member 900 is arranged to be removably coupled (for example, by screwing) to a cylindrical wall 280 surrounding an aperture 290 in the bottom of the drinking vessel 200. The sealing member 800 is arranged to move between a sealed and an unsealed position dependent on a pressure difference across the sealing member 800, i.e., a difference between the under-pressure in the drinking vessel 200 and the atmospheric pressure when the infant drinks. In the sealed position, the sealing member 800 is sealed against the base member 900, and in the unsealed position, the sealing member 800 is unsealed from the base member 900. The sealing member 800 can thereby allow air to enter the drinking vessel 200 as an infant sucks liquid from the teat 410 in the teat assembly 400.

FIGS. 8(*a*) to 8(*e*) show various views of the sealing member 800. The sealing member 800 comprises a cylindrical wall 840 having an upper inner portion 846, which is frustoconical, a lower inner portion 844, which is also frustoconical, and an outer portion 842, which is substantially vertical. An annular skirt (or 'annular flange') 820 projects inwards and downwards from the upper inner portion 846 and defines a central aperture 810. The upper inner frustoconical portion 846 is inverted, and therefore has a larger radius at the top than at the bottom, while the lower inner frustoconical portion 844 is not inverted, and therefore has a smaller radius at the top than at the bottom. As discussed in more detail below, the annular skirt 820 seals against the base member 900 when the sealing member 800 is in the sealed position, and is unsealed from the base member 900 when the sealing member 800 is in the unsealed position. As the infant sucks liquid from the teat 410 in the teat assembly 400, a pressure difference is created across the sealing member 800, and the annular skirt 820, or a portion thereof, moves, is distorted, or is otherwise made to lift off the base member 900.

A plurality of channels 830 is formed in the sealing member 800, spaced apart around a lower surface 835 of the sealing member and extending radially outwards. The channels 830 extend to a periphery of the sealing member 800, and allow air to enter the drinking vessel 200 from the periphery of the sealing member 800 when the sealing member is in the unsealed position.

The sealing member 800 further comprises an annular rib 850 at the foot of the outer portion 842 of the cylindrical wall 840. The annular rib 850 is arranged to engage with the wall 280 surrounding the aperture 290 in the bottom of the drinking vessel 200. The annular rib 850 prevents the sealing member 800 from being entirely pushed into the drinking vessel 200.

The channels 830 extend through the annular rib 850, allowing air to reach the inside of the drinking vessel 200 from the atmosphere.

The sealing member 800 may be fabricated from a material that is flexible and hygienic. For example, the sealing member 800 may be fabricated from silicone.

Of course, the sealing member 800 need not have exactly the same shape as that shown in FIGS. 8(*a*) to 8(*e*). For example, the upper inner portion 846 of the cylindrical wall 840 need not be frustoconical, and may instead be cylindrical, and the upper surface 845 of the cylindrical wall 840 may have a rectangular cross-sectional profile, as shown in FIG. 8(*f*). This provides the sealing member 800 with strength and resistance to deformation.

FIGS. 9(*a*) to 9(*e*) show various views of the base member 900. In particular, FIG. 9(*d*) shows a cross-section taken across line A in FIG. 9(*b*) (when the base member 900 is coupled to the bottle 200).

The base member 900 comprises a bowl-shaped portion 910 having a rim (or 'raised section') 914 and a recessed portion (or 'depression') 912, as well as three concentric cylindrical walls 920, 930, and 940. The bowl-shaped portion 910 is surrounded by an inner frustoconical wall 920, which extends downwards and radially outwards from the rim 914 of the bowl-shaped portion 910. The inner frustoconical wall 920 is in turn surrounded by an annular base portion 925, which is substantially horizontal. The annular base portion 925 is in turn surrounded by an inner cylindrical wall 930, which allows the base member 900 to be removably coupled to the wall 280 surrounding an aperture 290 in the bottom of the drinking vessel (or bottle) 200. The wall 280 surrounding the aperture 290 in the bottom of the drinking vessel 200 and the inner cylindrical wall 930 include matching screw threads, allowing the base member 900 to be screwed onto the wall 280 surrounding the aperture 290 in the bottom of the drinking vessel 200. The inner cylindrical wall 930 is in turn surrounded by an outer cylindrical wall 940, which increases the strength of the base member 900.

Figure 10A:
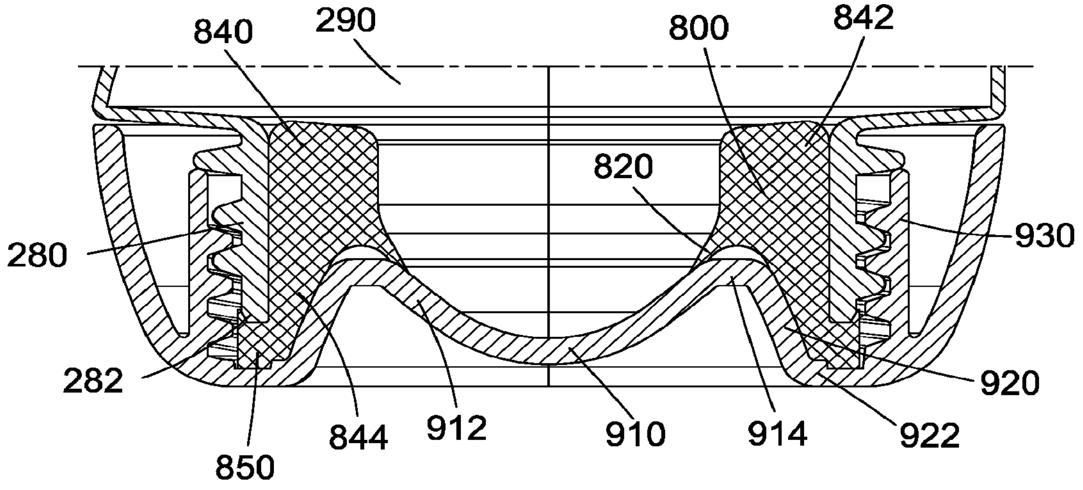
FIGS. 10(*a*) and 10(*b*) show cross-sectional views of a base member, sealing member, and bottle.
Figure 10B:
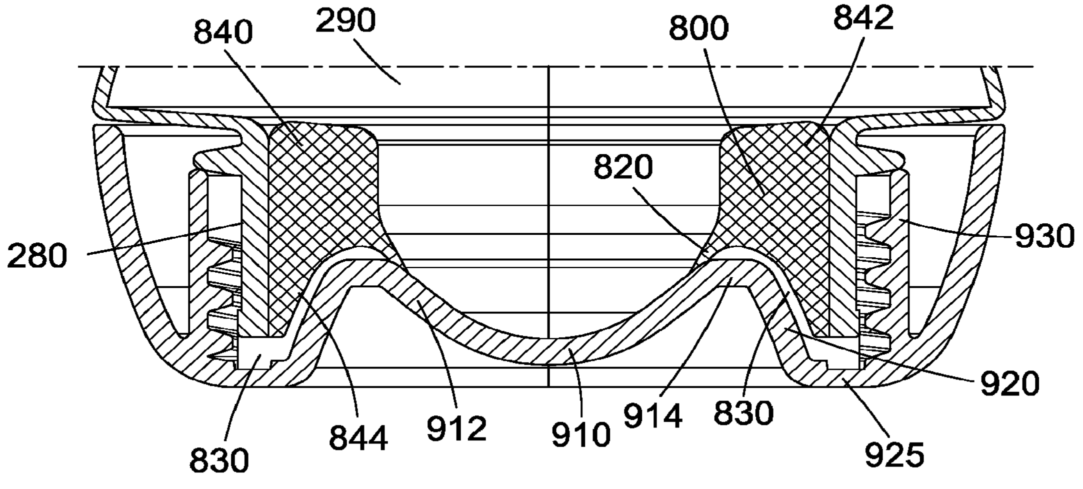

FIGS. 10(*a*) to 10(*b*) shows a cross-section of the base member 900 taken across line A in FIG. 9(*b*) when the sealing member 800 is placed within the aperture 290 and against the base member 900 and when the base member 900 is also coupled to the wall 280 surrounding the aperture 290. The sealing member 800 is shown in its sealed position. Although the sealing member 800 that is shown in FIGS. 10(*a*) to 10(*b*) is the alternative sealing member 800 of FIG. 8(*f*), the following description applies equally to the sealing member 800 of FIGS. 8(*a*) to 8(*e*).

In FIG. 10(*a*), the cross-section is taken such that no channels 830 are shown. In this case:

a) the annular skirt 820 of the sealing member 800 is sealed against the rim 914 or an upper portion of the recessed portion 912 of the bowl-shaped portion 910 of the base member 900;
b) the lower inner portion 844 of the cylindrical wall 840 of the sealing member 800 is sealed against the inner frustoconical wall 920 of the base member 900;
c) the outer portion 842 of the cylindrical wall 840 of the sealing member 800 is sealed against the cylindrical wall 280 surrounding the aperture 290 in the bottom of the drinking vessel 200; and
d) the annular rib 850 is sealed between a foot 922 of the inner frustoconical wall 920 and a foot 282 of the wall 280 surrounding the aperture 290 in the bottom of the drinking vessel 200. However, in some arrangements, seals a) to d) need not all be present.

In FIG. 10(*b*), the cross-section is taken such that channels 830 are shown. In this case:

a) the annular skirt 820 of the sealing member 800 is sealed against the rim 914 or an upper portion of the recessed portion 912 of the bowl-shaped portion 910 of the base member 900;

b) a channel 830 is formed between the lower inner portion 844 of the cylindrical wall 840 of the sealing member 800 and the inner frustoconical wall 920 of the base member 900, and the seal between the lower inner portion 844 of the cylindrical wall 840 of the sealing member 800 and the inner frustoconical wall 920 of the base member 900 is thereby locally compromised; c) the outer portion 842 of the cylindrical wall 840 of the sealing member 800 is sealed against the cylindrical wall 280 surrounding the aperture 290 in the bottom of the drinking vessel 200; and d) a channel 830 is formed in the annular rib 850, and the seal between the annular rib 850 and the foot 922 of the inner frustoconical wall 920 and the foot 282 of the wall 280 surrounding the aperture 290 in the bottom of the drinking vessel 200 is thereby locally compromised. However, in some arrangements, seals a) and c) need not both be present and seals b) and d) need not both be compromised.

The angle of the annular skirt 820 relative to the recessed portion 912 of the bowl-shaped portion 910, and the length of the annular skirt 820 may be chosen in order to achieve a good seal of the annular skirt 820 against the bowl-shaped portion 910, thereby avoiding leakage of liquid from the drinking vessel 200, but also allowing the annular skirt 820 to easily be moved, distorted, or otherwise lifted from the bowl-shaped portion 910 when a pressure difference is created across the sealing member 800. If the annular skirt 820 does not move, is not distorted, or does not otherwise lift off the bowl-shaped portion 910, the teat assembly 400 may collapse when the infant drinks from the drinking vessel 200. In contrast, if the annular skirt 820 moves, become distorted, or otherwise lifts too easily off the bowl-shaped portion 910, liquid is able to escape from the drinking vessel 200 when it is dropped or shaken.

Figure 11:
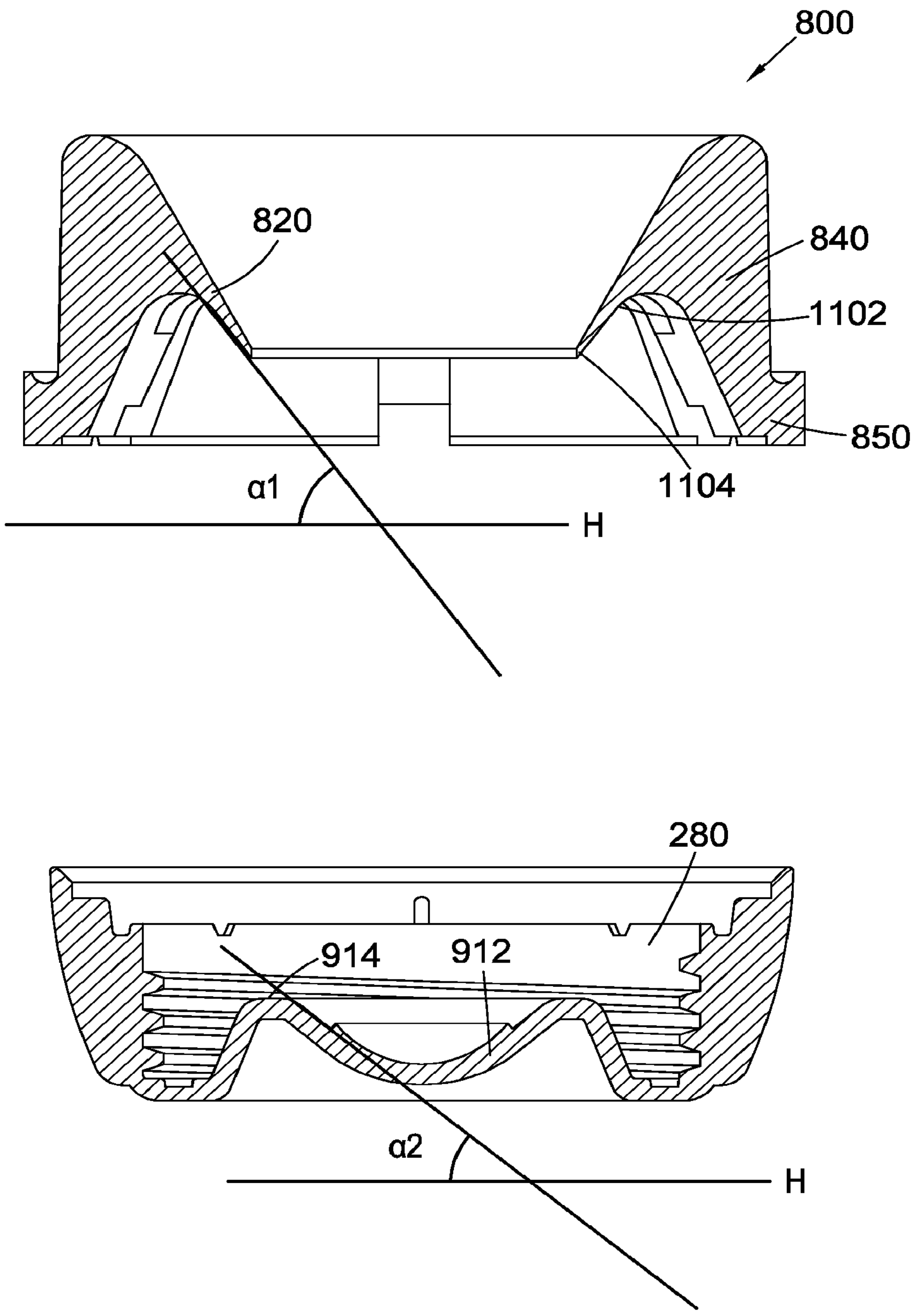
FIG. 11 shows angles of components of a valve assembly.

In the example of FIG. 11, the lower surface of the annular skirt 820 projects inwards and downwards at an acute angle a1 relative to a horizontal axis H, and the recessed portion 912 of the bowl-shaped portion 910 extends inwards and downwards from the rim 914 at an acute angle a2 relative to the horizontal axis H.

Angle a1 may be chosen to be larger than angle a2. In this way, when the sealing member 800 is in the sealed position, the lower surface of the annular skirt 820 experiences a biasing force that presses it against the rim 914, thereby closing off the channels 830. When a baby feeds from the teat 410, a low pressure is generated within the bottle, which results in a pressure differential across the annular skirt 820, allowing air in the channels 830 to overcome the biasing force and push the annular skirt 820 away from the base member 900 and to vent into the drinking vessel 200.

In one example, angle a1 may be approximately 54.5°, and angle a2 may be approximately 40°. The annular skirt 820 is therefore deflected upward by approximately 14.5° in order to seal the annular skirt 820 against the bowl-shaped portion 910. However, in some examples, the annular skirt 820 may be deflected by R3 to R4 degrees, wherein each of R3 and R4 is one of 10, 11, 12, 13, 14, 15, 16, 17, 18, 19, and 20. Of course, the degree of deflection need not be an integer, and may be any real number in the range R3 to R4 degrees. In practice, the degree of deflection required for optimum sealing may depend on the type of liquid and the volume of liquid contained in the drinking vessel 200, on the diameter of the drinking vessel 200 or of the base member 900, and on the orientation of the drinking vessel 200. A thickness of the annular skirt 820 is approximately 0.25 mm at the point where it makes contact with the base member 900. However, in some examples, the thickness of the annular skirt 820 is between R5 and R6 mm at the point where it makes contact with the base member 900, wherein each of R5 and R6 is one of 0.1, 0.2, 0.3, 0.4 and 0.5. Of course, the thickness need not be limited to one decimal place, and may be any real number in the range R5 to R6 millimetres.

If the annular skirt 820 is too long, the annular skirt 820 may pucker, i.e., ripples may appear in the annular skirt 820, thereby creating leakage paths. This problem may be avoided by choosing an annular skirt 820 with a suitable length. In one example, the annular skirt 820 length is chosen as 3.7 mm measured, as per the cross section view of FIG. 11, as the length of the substantially straight edge of the lower face of the skirt 820. In other words, the length of the downward and inward projection from the end 1102 of the curve of the arch to the internal tip 1104 of the annular skirt 820. However, in some examples, the length of annular skirt 820 may be between R7 and R8 mm, wherein each of R7 and R8 is one of 3.3, 3.4, 3.5, 3.6, 3.7, 3.8, 3.9 and 4.0. Of course, the length need not be limited to one decimal place, and may be any real number in the range R7 to R8 millimetres.

As the annular skirt 820 points down when the sealing member 800 is placed against the base member 900, when the drinking vessel 200 is stood on its base, the weight of the liquid contained in the drinking vessel 200 enhances the seal between the annular skirt 820 and the base member 900, thereby avoiding leaks.

Figure 12:
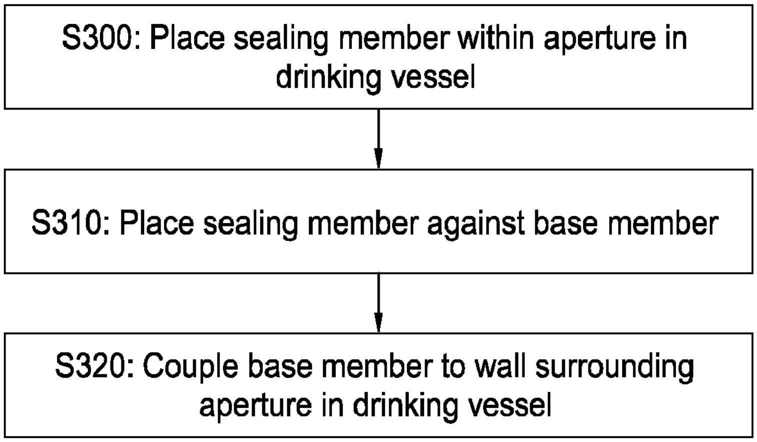
FIG. 12 shows a flow chart of a method of assembling a valve assembly.

The valve assembly 700 may be assembled using the method shown in FIG. 12. In step S300, the sealing member 800 is placed within the aperture 290 in the bottom of the drinking vessel 200, or more specifically, against the wall 280 surrounding the aperture 290 in the drinking vessel 200. In step S310, the sealing member is placed against the base member 900. In step 320, the base member 900 is coupled to the wall 280 surrounding the aperture 290 in the drinking vessel 200. It should be understood that the steps of this method need not be performed in this particular order. For example, the order of steps S300 and S310 could be swapped.

The valve assembly 700 described herein does not rely on apertures in the base member 900, e.g., in the bottom of the base member 900. As a result, the valve assembly 700 is not easily blocked, e.g., by a parent covering the apertures. Instead, air is delivered by the pathways extending around the entire screw thread of the inner cylindrical wall 930 and the gap around the top of the base member 900.

An effect of the present disclosure is that, even if there is a slight distortion and breakthrough at the annular skirt 820, liquid will not easily leak from the drinking vessel 200, as there is a 'tortuous path' (back along the channels 830) for the liquid to work its way around before it can leak, i.e., the air inlet is remote from the sealing surface.

In the above, the channels 830 have been described as being formed in the sealing member 800. However, as an alternative, they could instead be formed in the base member 900.

The bottle assembly 100 and valve assembly 700 may be formed in any appropriate manner, such as moulding, and from any appropriate material. For example, the bottle 200 may be made of polypropylene. The teat assembly 400 may be made from silicone or a thermoplastic elastomer.

Although the bottle assembly 100 and valve assembly 700 have been described in the context of drinking vessels containing milk for infants, it will be understood that they may also be used with any other beverage or liquid, and that they may also be used by adults (e.g., in a sports bottle) or by animals.

Although the figures described herein show a particular example of a bottle assembly 100 and valve assembly 700, it will be understood that any of the examples of the bottle assembly 100 described herein may be combined with any of the examples of the valve assembly 700 described herein.

Although in the examples and figures described herein the valve assembly 700 forms part of the bottle assembly 100 described above, the valve assembly 700 and bottle assembly 100 may be used separately, e.g., the valve assembly 700 may be used in conjunction with any suitable bottle 200 and the bottle assembly 100 may be used without the valve assembly 700.

Although in the examples and figures described herein the bottle assembly 100 relates to a snap-fit to the top of the bottle 200 and enables a collar 300 to be coupled to the neck 210 of the bottle, the bottle assembly 100 could instead, or additionally, be applied to the bottom of, or to a base portion of, the bottle 200. In particular, this enables the base member 900 to 'snap fit' to the cylindrical wall 280 surrounding the aperture 290 in the bottom of the drinking vessel 200. When the collar 300 is coupled to the bottom of the bottle 200, references in the above description to top and bottom, to upper and lower, and to downward and upward should of course be reversed.

The invention claimed is:

1. A bottle assembly comprising:
- a bottle comprising a closed base;
- a wall extending upwards from an outer perimeter of the base;
- a shoulder opposite the base extending radially inward from an inner surface of the wall;
- a cylindrical neck extending upwards from an inner edge of the shoulder, the neck surrounding an opening at a top of the bottle;
- a collar comprising an aperture
- a teat configured to be coupled to the collar;
- a first detent formation inward of the inner surface of the bottle wall and extending upward from a top surface of the shoulder at an outer periphery of the neck; and
- a complimentary second detent formation extending radially inward from an inner edge of the collar and;
- wherein the collar is configured to snap fit to the shoulder by engagement of the first detent formation with the complementary second detent formation by application of force in a downward direction towards the base of the bottle.

2. The bottle assembly of claim 1, wherein the first detent formation is female and the complementary second detent formation is male.

3. The bottle assembly of claim 1, wherein the first detent formation has at least one open side permitting the collar to be uncoupled from the shoulder when the collar is rotated with respect to the bottle.

4. The bottle assembly of claim 1, wherein the first detent formation comprises an angled upper portion, a substantially vertical central portion, and a comparatively recessed lower portion.

5. The bottle assembly of claim 4, wherein a transition between the upper portion and the central portion is rounded.

6. The bottle assembly of claim 4, wherein the comparatively recessed lower portion is substantially planar and extends tangentially to the neck.

7. The bottle assembly of claim 1, wherein the shoulder and the collar each further comprise at least one orienting protrusion arranged to prevent the shoulder and collar from snap fitting in a predetermined orientation.

8. The bottle assembly of claim 1, wherein the shoulder further comprises a plurality of first detent formations and the collar further comprises a plurality of complementary second detent formations.

9. The bottle assembly of claim 1, wherein a top surface of the shoulder and a lower rim of the collar have radially asymmetric complementary shapes to ensure the shoulder and collar fit in a predetermined orientation.

10. The bottle assembly of claim 1, wherein the teat comprises an annular flange arranged to seal against a rim of the neck when the collar is snap fitted to the shoulder.

11. The bottle assembly of claim 10, wherein the annular flange is further arranged to seal against the collar.

12. The bottle assembly of claim 1, wherein the collar is made from a polypropylene material.

13. The bottle assembly of claim 1, wherein the complementary second detent formation is formed integrally with the collar.

14. A bottle assembly comprising:
- a bottle comprising a shoulder opposite a closed end, the shoulder extending radially inward from an inner surface of a bottle wall, the shoulder having a cylindrical neck surrounding an opening at the center of the shoulder;
- a first detent formation extending upward from the shoulder at the periphery of the neck;
- a collar comprising an aperture and a complementary second detent formation; and
- a teat configured to be coupled to the collar;
- wherein the collar is configured to snap fit to the shoulder by application of force in a downward direction towards the closed end by the coupling of the first detent formation with the complementary second detent formation extending radially inward from an inner edge of the collar; and
- wherein the collar is further configured to disengage from the shoulder.

15. A bottle assembly comprising:
- a bottle with a shoulder opposite a closed base, the shoulder extending radially inward from an inner surface of a bottle wall and having an open cylindrical neck, the neck extending upward from an inner edge of the shoulder,
- a first detent formation at an outer periphery of the neck, the first detent formation extending upward from the shoulder; and
- a teat assembly comprising a teat and a collar, the collar comprising a complementary second detent formation extending radially inward from an inner edge of the collar;
- wherein the first detent formation removably engages with the complementary second detent formation to couple the teat assembly over the neck of the bottle by an application of force pushing the teat assembly downward against the neck of the bottle.

* * * * *